(12) United States Patent
Mahler

(10) Patent No.: US 6,962,665 B2
(45) Date of Patent: Nov. 8, 2005

(54) REFRIGERANT COMPOSITIONS CONTAINING A COMPATIBILIZER

(75) Inventor: Walter Mahler, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/010,187

(22) Filed: Dec. 6, 2001

(65) Prior Publication Data

US 2003/0034477 A1 Feb. 20, 2003

Related U.S. Application Data

(60) Provisional application No. 60/254,208, filed on Dec. 8, 2000, and provisional application No. 60/304,552, filed on Jul. 11, 2001.

(51) Int. Cl.$^7$ .......................... C09K 5/04; C10M 105/56
(52) U.S. Cl. .......................................... 252/68; 508/244
(58) Field of Search ................................ 508/244, 297; 208/19; 252/68

(56) References Cited

U.S. PATENT DOCUMENTS

| | | |
|---|---|---|
| 3,085,868 A | 4/1963 | Champagnat |
| 4,010,107 A | 3/1977 | Rothert |
| 4,200,543 A | 4/1980 | Liston et al. |
| 4,355,960 A | 10/1982 | Gainer et al. |
| 4,359,394 A | 11/1982 | Gainer et al. |
| 4,428,854 A | 1/1984 | Enjo et al. |
| 4,431,557 A | 2/1984 | Shimizu et al. |
| 4,559,154 A | 12/1985 | Powell |
| 4,707,996 A | 11/1987 | Vobach |
| 4,755,316 A | 7/1988 | Magid et al. |
| 4,938,887 A | 7/1990 | Grava et al. |
| 4,963,280 A | 10/1990 | Wilkins et al. |
| 4,975,212 A | 12/1990 | Thomas et al. |
| 4,983,313 A | 1/1991 | Kaneko et al. |
| 4,992,188 A | 2/1991 | Jolley |
| 5,023,007 A | 6/1991 | Grava et al. |
| 5,104,560 A | 4/1992 | Huster et al. |
| 5,145,594 A | 9/1992 | Anton et al. |
| 5,154,846 A | 10/1992 | Thomas et al. |
| 5,194,171 A | 3/1993 | Jolley |
| 5,240,630 A * | 8/1993 | Sabahi et al. .................. 252/68 |
| 5,254,280 A | 10/1993 | Thomas et al. |
| 5,295,357 A | 3/1994 | Kaneko |
| 5,300,245 A | 4/1994 | Sawada et al. |
| 5,368,765 A | 11/1994 | Kaneko |
| 5,370,812 A | 12/1994 | Brown |
| 5,372,737 A | 12/1994 | Spauschus |
| 5,401,433 A | 3/1995 | Sawada et al. |
| 5,417,872 A | 5/1995 | Fukuda et al. |
| 5,431,835 A | 7/1995 | Katafuchi et al. |
| 5,514,221 A | 5/1996 | Bolmer |
| 5,549,835 A | 8/1996 | Uematsu et al. |
| 5,801,132 A | 9/1998 | Kaneko et al. |
| 5,826,436 A | 10/1998 | Scaringe et al. |
| 5,987,902 A | 11/1999 | Scaringe et al. |
| 6,074,573 A | 6/2000 | Kaneko |
| 6,183,661 B1 | 2/2001 | Makin et al. |
| 6,251,300 B1 | 6/2001 | Takigawa et al. |

FOREIGN PATENT DOCUMENTS

| | | |
|---|---|---|
| CA | 973700 | 9/1975 |
| DE | 133967 | 1/1979 |
| EP | 0 083 933 A1 | 7/1983 |
| EP | 0 521 650 A1 | 6/1992 |
| EP | 571091 A1 | 11/1993 |
| EP | 612839 A1 * | 8/1994 |
| EP | 645443 B1 | 3/1995 |
| EP | 0 699 742 A2 | 3/1996 |
| EP | 784090 A1 | 7/1997 |
| EP | 406433 B1 | 12/1997 |
| JP | 02930963 B9 | 7/1990 |
| JP | 05025468 | 2/1993 |
| JP | 05060406 | 3/1993 |
| JP | 05202389 | 8/1993 |
| JP | 05295386 | 11/1993 |
| JP | 94330063 | 11/1994 |
| JP | 07097587 | 4/1995 |
| JP | 08319478 | 12/1996 |
| JP | 08337774 | 12/1996 |
| JP | 09067291 | 3/1997 |
| JP | 1997208980 A | 8/1997 |
| JP | 09227884 | 9/1997 |
| JP | 1998-140175 | 5/1998 |
| JP | 11315295 | 11/1999 |
| JP | 2000-104087 | 4/2000 |
| WO | WO 84/01165 A | 3/1984 |
| WO | WO 01/57164 A1 | 8/2001 |

OTHER PUBLICATIONS

"Oil Returnability Improvement by Introducing n–Pentane As Oil–Carrier"; presented on Jul. 17, 1998, by Norio Sawada, The First Alkylbenzene Conference, Purdue University Inn and Conference Center, West Lafayette, IN, USA.

English Abstract for JP 02286780 Patent, dated Nov. 26, 1990, Assignee: Asahi Glass Co., Ltd.

English Abstract for JP 59117590 Patent, dated Jul. 6, 1984, Assignee: Nishi Nippon Tsusho.

International Search Report dated Feb. 7, 2003.

English Abstract for JP 09208980 (1997208980A) Patent, dated Aug. 12, 1997, Assignee: Nippon Oil Co., Ltd. (English translation of entire patent is cited on PTO/SB/08A filed herewith).

* cited by examiner

Primary Examiner—John R. Hardee
(74) Attorney, Agent, or Firm—Mark A. Edwards; Chyrrea J. Sebree

(57) ABSTRACT

The present invention provides compositions that are useful for compatabilizing a conventional, non-polar, compression refrigeration lubricant and a hydrofluorocarbon and/or hydrochlorofluorocarbon refrigerant in a compression refrigeration apparatus. Additionally, these composition promote efficeint return of lubricant from the non-compressor zones to the compressor zones of the aforesaid refrigeration apparatus.

6 Claims, 10 Drawing Sheets

REFRIGERANT COMPOSITIONS CONTAINING A COMPATIBILIZER

CROSS REFERENCE TO RELATED APPLICATIONS

This application claims the priority benefit of U.S. Provisional Application 60/254,208, filed Dec. 8, 2000, and U.S. Provisional Application 60/304,552, filed Jul. 11, 2001.

FIELD OF THE INVENTION

The present invention relates to refrigerant compositions comprising relatively polar, halogenated hydrocarbon refrigerant; relatively non-polar, conventional, compression refrigeration lubricant; and a compound that compatibilizes said polar halogenated hydrocarbon and non-polar lubricant. The compatibilizer decreases the viscosity of the lubricant in the coldest portions of a compression refrigeration apparatus by solubilizing halogenated hydrocarbon and lubricant, which results in efficient return of the lubricant from non-compressor zones to a compressor zone in a compression refrigeration system.

BACKGROUND

Over the course of the last twenty (20) years it has been debated whether the release of chlofluorocarbons into the atmosphere has effected the stratospheric ozone layer. As a result of this debate and international treaties, the refrigeration and air-conditioning industries have been weaning themselves from the use and production of certain chlorofluorocarbons (CFCs) and hydrochlorofluorocarbons (HCFCs). Presently, the industries are transitioning towards the use of hydrofluorocarbons (HFCs) having zero ozone depletion potential. Notably, this transition to HFCs necessitated the advent of a new class of lubricants because of the immiscibility of conventional lubricants, such as mineral oil, poly α-olefin and alkylbenzene with HFC refrigerants.

The new class of lubricants includes polyalkylene glycols (PAGs) and polyol esters (POEs) lubricants. While the PAG and POE lubricants have suitable lubricant properties, they are extremely hygroscopic and can absorb several thousand ppm (parts per million) of water on exposure to moist air. This absorbed water leads to undesirable formation of acids that cause corrosion of the refrigeration system and formation of intractable sludges. In comparison, conventional refrigeration lubricants are considerably less hygroscopic and have low solubility, less than 100 ppm for water. Further, PAGs and POEs are considerably more expensive than conventional refrigeration lubricants—typically on the order of three to six times more. PAGs and POEs have also been found to have unfavorable electrical insulating properties.

Accordingly, there existed a need and an opportunity to resolve this solubility problem so that the refrigeration industry could utilize the conventional non-polar mineral oil and alkylbenzene lubricants with polar HFC-based refrigerants. Another need and opportunity also existed when the industry began transitioning towards the use of HCFC-based refrigerants as a replacement for pure CFC refrigerants. This need became apparent due to the diminished solubility of HCFCs in mineral oil, which forced the industry to incurr an additional expense of changing the lubricant to an alkylbenzene to achieve adequate lubricating and cooling performance.

For the last ten years the refrigeration and air-conditioning industries have been struggling with these long-felt but unsolved needs, finally, the present invention satisfies the pressing needs of these industries. While numerous attempts have been made to use conventional non-polar lubricants with polar hydrofluorocarbon refrigerants, the lack of solubility of the polar refrigerant in the non-polar conventional lubricant generally results in a highly viscous lubricant in the non-compressor zones, which unfortunately results in insufficient lubricant return to the compressor. When the non-polar conventional lubricant and the polar refrigerant naturally escape the compressor and enter the non-compressor zones, phase separation/insolubilty of the lubricant and the refrigerant occurs. This phase separation contributes to the highly viscous lubricant remaining in the non-compressor zone, whilst the refrigerant continues its path throughout the refrigeration system. The insolubility and highly viscous nature of the lubricant leaves the lubricant stranded in the non-compressor zones, which leads to an undesirable accumulation of lubricant in the non-compressor zones. This accumulation of lubricant and the lack of return of the lubricant to the compressor zone eventually starves the compressor of lubricant and results in the compressor overheating and seizing. Such stranded lubricant may also decrease the efficiency of the refrigeration system by interfering with heat transfer, due to thick lubricant films deposited on interior surfaces of the heat exchangers (e.g. condensor and evaporator). Further, during cold compressor starts, insoluble refrigerant and lubricant may cause compressor seizure due to poor lubrication and foaming of the lubricant.

For the foregoing reasons, there is a well-recognized need in the refrigeration and air-conditioning industries for a compatabilizer that compatibilizes a polar halogenated hydrocarbon and a non-polar conventional lubricant in a compression refrigeration system, and promotes efficient return of lubricant to the compressor.

SUMMARY

The present invention is directed to lubricant and refrigerant compositions containing a compatibilizer that satisfies the refrigeration and air-conditioning industries's problem of insolubility between conventional non-polar compression refrigeration lubricants and polar hydrofluorocarbon and/or hydrochlorofluorocarbon refrigerants. The compatibilizers decrease the viscosity of the non-polar lubricant in the coldest portions of a compression refrigeration apparatus by solubilizing the polar halogenated hydrocarbon and lubricant in the non-compressor zones, which results in efficient return of lubricant from non-compressor zones to a compressor zone. The present invention is also directed to processes for returning lubricant from a non-compressor zone to a compressor zone in a compression refrigeration system, methods of solubilizing a halogenated hydrocarbon refrigerant in a lubricant, as well as methods of lubricating a compressor in a compression refrigeration apparatus containing a halogenated hydrocarbon refrigerant.

The present invention comprises lubricant compositions for use in compression refrigeration and air conditioning apparatus comprising: (a) at least one lubricant selected from the group consisting of paraffins, napthenes, aromatics and poly-α-olefins, and (b) at least one compatibilizer. The present invention further comprises refrigerant compositions for use in compression refrigeration and air conditioning comprising: (a) at least one halogenated hydrocarbon selected from the group consisting of hydrofluorocarbons and hydrochlorofluorocarbons; (b) at least one lubricant selected from the group consisting of paraffins, napthenes, aromatics and poly-α-olefins; and (c) at least one compatibilizer. The present invention further comprises compositions for use in compression refrigeration and air conditioning apparatus containing paraffinic, napthenic, aromatic and/or poly-α-olefinic lubricant comprising: (a) at least one halogenated hydrocarbon selected from the group consisting of hydrofluorocarbons and hydrochlorofluorocarbons; and (b) at least one compatibilizer.

The present invention also provides processes for returning lubricant from a non-compressor zone to a compressor zone in a compression refrigeration system comprising: (a) contacting a lubricant selected from the group consisting of paraffins, naphthenes, aromatics, and polyalphaolefins, in said non-compressor zone with a halogenated hydrocarbon selected from the group consisting of hydrofluorocarbons and hydrochlorofluorocarbons, in the presence of a compatibilizer to form a solution comprising said lubricant, said halogenated hydrocarbon, and said compatibilizer; and (b) transferring said solution from said non-compressor zone to said compressor zone of said refrigeration system.

The present invention further provides methods of solubilizing a halogenated hydrocarbon refrigerant selected from the group consisting of hydrofluorocarbons and hydrochlorofluorocarbons, in a lubricant selected from the group consisting of paraffins, naphthenes, aromatics, and polyalphaolefins, which comprise the steps of contacting said lubricant with said halogenated hydrocarbon refrigerant in the presence of an effective amount of a compatibilizer and forming a solution of said lubricant and said halogenated hydrocarbon refrigerant.

The present invention further pertains to methods of lubricating a compressor in a compression refrigeration apparatus containing a halogenated hydrocarbon refrigerant selected from the group consisting of hydrofluorocarbons and hydrochlorofluorocarbons, comprising the step of adding to said compressor a composition comprising: (a) at least one lubricant selected from the group consisting of paraffins, naphthenes, aromatics, and polyalphaolefins; and (b) at least one compatibilizer. The present invention also pertains to a method for delivering a compatibilizer to a compression refrigeration apparatus.

The lubricants and/or refrigerant compositions, as well as the above described methods and/or processes can optionally include a fragrance.

Compatibilizers of the present invention include:

(i) polyoxyalkylene glycol ethers represented by the formula $R^1[(OR^2)_xOR^3]_y$, wherein: x is selected from integers from 1 to 3; y is selected from integers from 1 to 4; $R^1$ is selected from hydrogen and aliphatic hydrocarbon radicals having 1 to 6 carbon atoms and y bonding sites; $R^2$ is selected from aliphatic hydrocarbylene radicals having from 2 to 4 carbon atoms; $R^3$ is selected from hydrogen, and aliphatic and alicyclic hydrocarbon radicals having from 1 to 6 carbon atoms; at least one of $R^1$ and $R^3$ is selected from said hydrocarbon radicals; and wherein said polyoxyalkylene glycol ethers have a molecular weight of from about 100 to about 300 atomic mass units and a carbon to oxygen ratio of from about 2.3 to about 5.0;

(ii) amides represented by the formulae $R^1CONR^2R^3$ and cyclo-$[R^4CON(R^5)-]$, wherein $R^1$, $R^2$, $R^3$ and $R^5$ are independently selected from aliphatic and alicyclic hydrocarbon radicals having from 1 to 12 carbon atoms; $R^4$ is selected from aliphatic hydrocarbylene radicals having from 3 to 12 carbon atoms; and wherein said amides have a molecular weight of from about 120 to about 300 atomic mass units and a carbon to oxygen ratio of from about 7 to about 20, (iii) ketones represented by the formula $R^1COR^2$, wherein $R^1$ and $R^2$ are independently selected from aliphatic, alicyclic and aryl hydrocarbon radicals having from 1 to 12 carbon atoms, and wherein said ketones have a molecular weight of from about 70 to about 300 atomic mass units and a carbon to oxygen ratio of from about 4 to about 13, (iv) nitrites represented by the formula $R^1CN$, wherein $R^1$ is selected from aliphatic, alicyclic or aryl hydrocarbon radicals having from 5 to 12 carbon atoms, and wherein said nitrites have a molecular weight of from about 90 to about 200 atomic mass units and a carbon to nitrogen ratio of from about 6 to about 12, (v) chlorocarbons represented by the formula $RCl_x$, wherein; x is selected from the integers 1 or 2; R is selected from aliphatic and alicyclic hydrocarbon radicals having from 1 to 12 carbon atoms; and wherein said chlorocarbons have a molecular weight of from about 100 to about 200 atomic mass units and carbon to chlorine ratio from about 2 to about 10, (vi) aryl ethers represented by the formula $R^1OR^2$, wherein: $R^1$ is selected from aryl hydrocarbon radicals having from 6 to 12 carbon atoms; $R^2$ is selected from aliphatic hydrocarbon radicals having from 1 to 4 carbon atoms; and wherein said aryl ethers have a molecular weight of from about 100 to about 150 atomic mass units and a carbon to oxygen ratio of from about 4 to about 20, (vii) 1,1,1-trifluoroalkanes represented by the formula $CF_3R^1$, wherein $R^1$ is selected from aliphatic and alicyclic hydrocarbon radicals having from about 5 to about 15 carbon atoms; and (viii) fluoroethers represented by the formula $R^1OCF_2CF_2H$, wherein $R^1$ is selected from aliphatic and alicyclic hydrocarbon radicals having from about 5 to about 15 carbon atoms.

In the compositions of the present invention, the weight ratio of said lubricant to said compatibilizer is from about 99:1 to about 1:1.

BRIEF DESCRIPTION OF THE FIGURES

The present invention is better understood with reference to the following figures, where.

Figure 1:
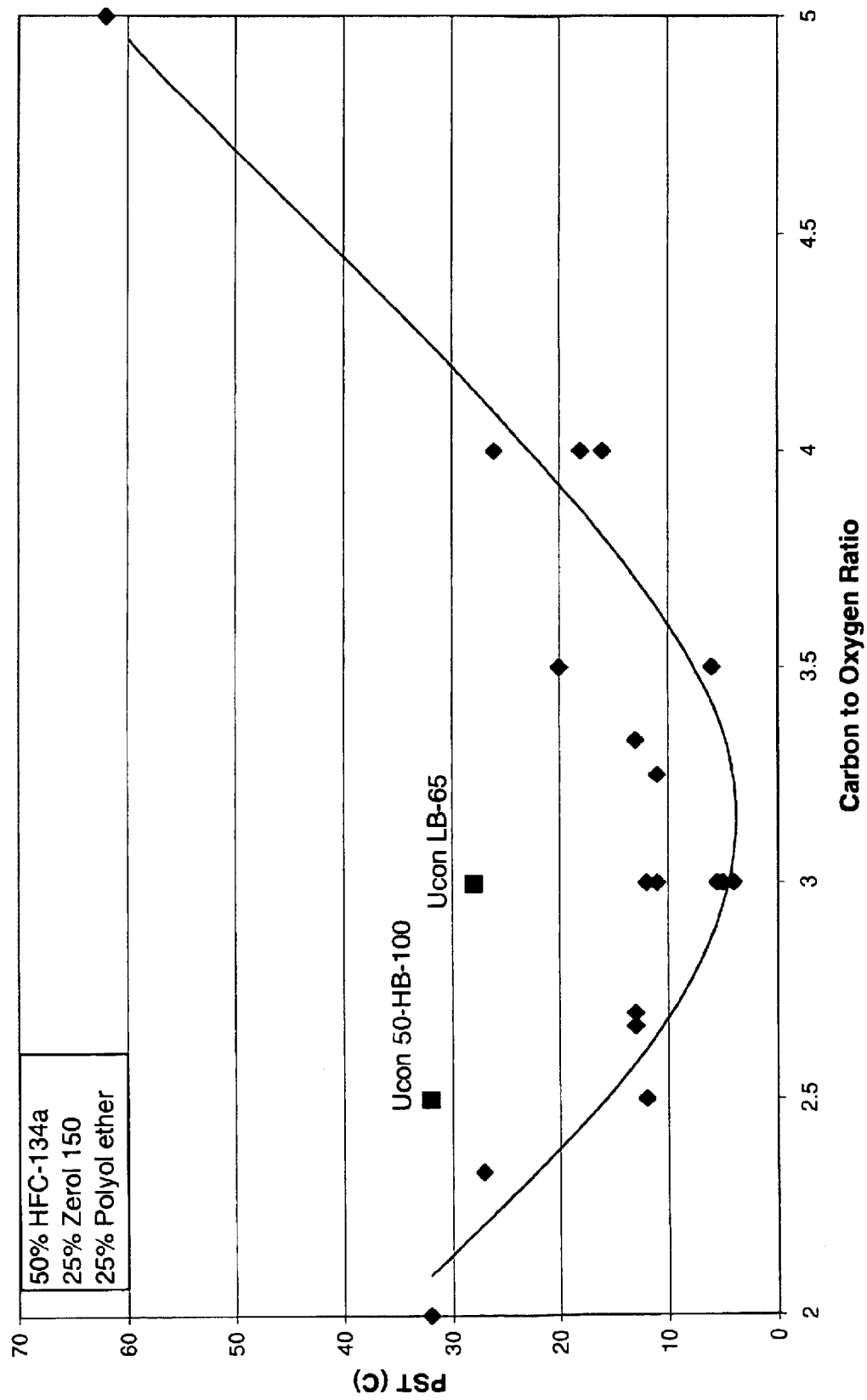
FIG. 1 is a graph of phase separation temperature ("PST")(° C.) versus carbon to oxygen ratio for various polyoxyalkylene glycol ether compatibilizers (25 wt %), HFC-134a refrigerant (50 wt %) and Zerol® 150 (alkyl benzene lubricant from Shrieve Chemicals) (25 wt %).

These and other features, aspects, and advantages of the present invention will become better understood with reference to the following description and the appended claims.

DETAILED DESCRIPTION

The present inventors discovered that using an effective amount of the present compatibilizers in conventional compression refrigeration lubricants results in efficient return of lubricant from non-compressor zones to a compressor zone in a compression refrigeration system. The compatibilizers travel throughout a compression refrigeration system mixed with refrigerant and with lubricant that escapes the compressor. Use of compatibilizers results in the decrease of the viscosity of lubricant in the coldest portions of compression refrigeration systems, such as an evaporator, thereby enabling return of the lubricant from the evaporator to the compressor. The inventors discovered that the viscosity of lubricant in the coldest sections of compression refrigeration systems is reduced upon use of the present compatibilizers. This reduction in lubricant viscosity is due to an increase in solubility of halogenated hydrocarbon refrigerants in lubricant containing the compatibilizers. Through control of the ratio of carbon to polar groups (e.g. ether, carbonyl, nitrile, halogen) in the compatibilizer, the inventors discovered that the polar group-containing compatibilizer could surprisingly be caused to remain miscible with the essentially non-polar lubricants in the coldest sections of compression refrigeration apparatus and simultaneously increase the solubility of halogenated hydrocarbon refrigerant in the lubricant. Without wishing to be bound by theory, the polar functional groups in the present compatibilizers are attracted to the relatively polar halogenated hydrocarbon refrigerant while the hydrocarbon portion of the compatibilizer is miscible with the relatively low polarity lubricant. The result upon use of the present compatibilizers in the present conventional lubricants is an increase in the solubility of halogenated hydrocarbon refrigerants in lubricant containing an effective amount of compatibilizer. This increased solubility of the relatively nonviscous halogenated hydrocarbon refrigerant in conventional lubricants leads to lowering of the viscosity of the lubricant, and results in efficient return of lubricant from non-compressor zones to a compressor zone in a compression refrigeration system. Reducing the amount of lubricant in the evaporator zone also improves heat transfer of the refrigerant and thus improves refrigerating capacity and efficiency of a system. Thus, the present compatibilizers allow for the use of relatively polar halogenated hydrocarbon refrigerants, such as hydrofluorocarbons and hydrochlorofluorocarbons, with relatively non-polar conventional lubricants; mixtures which are normally immiscible and previously thought to be not useful together as refrigerant compositions in compression refrigeration systems.

The result of increased solubility of halogenated hydrocarbon refrigerants in conventional lubricants further allows liquid refrigerant to dissolve and carry stranded lubricant out of the condenser, improving both lubricant return and heat transfer in the condenser and resulting in improved capacity and efficiency of the refrigeration system.

The present compatibilizers improve the energy efficiency and capacity of a compression refrigeration system by increasing the enthalpy change upon desorption of halogenated hydrocarbon refrigerant from lubricant and compatibilizer composition in the evaporator, as well as absorption of refrigerant into the lubricant and compatibilizer composition in the condenser. Without wishing to be bound by theory, it is believed that forming and breaking attractions between the refrigerant and the polar functional group-containing compatibilizer results in the increase in enthalpy change.

In most instances, the volume resistivity (ohmxcm) of polyol ester and polyalkylene glycol lubricants presently used with hydrofluorocarbon-based refrigerants is unacceptably low. The present compositions comprising compatibilizer and conventional lubricant have increased volume resistivity versus polyol ester and polyalkylene glycol lubricants.

The present compatibilizers may beneficially increase the viscosity index of conventional lubricants. This gives the desirable result of lower viscosity at low temperature without significantly lowering viscosity at high temperature, a viscosity profile similar to that of many polyol esters. Such a viscosity index ensures lubricant return from the evaporator while maintaining acceptable viscosity for compressor operation.

In the present compositions comprising lubricant and compatibilizer, from about 1 to about 50 weight percent, preferably from about 6 to about 45 weight percent, and most preferably from about 10 to about 40 weight percent of the combined lubricant and compatibilizer composition is compatibilizer. In terms of weight ratios, in the present compositions comprising lubricant and compatibilizer, the weight ratio of lubricant to compatibilizer is from about 99:1 to about 1:1, preferably from about 15.7:1 to about 1.2:1, and most preferably from about 9:1 to about 1.5:1. Compatibilizer may be charged to a compression refrigeration system as a composition of compatibilizer and halogenated hydrocarbon refrigerant. When charging a compression refrigeration system with the present compatibilizer and halogenated hydrocarbon refrigerant compositions, to deliver an amount of compatibilizer such that the aforementioned relative amounts of compatibilizer and lubricant are satisfied, the compatibilizer and halogenated hydrocarbon refrigerant composition will typically contain from about 0.1 to about 40 weight percent, preferably from about 0.2 to about 20 weight percent, and most preferably from about 0.3 to about 10 weight percent compatibilizer in the combined compatibilizer and halogenated hydrocarbon refrigerant composition. In compression refrigeration systems containing the present compositions comprising halogenated hydrocarbon refrigerant, lubricant and compatibilizer, from about 1 to about 70 weight percent, preferably from about 10 to about 60 weight percent of the halogenated hydrocarbon refrigerant, lubricant and compatibilizer composition is lubricant and compatibilizer. Compatibilizer concentrations greater than about 50 weight percent of the combined lubricant and compatibilizer composition are typically not needed to obtain acceptable lubricant return from non-compressor zones to a compressor zone. Compatibilizer concentrations greater than about 50 weight percent of the combined lubricant and compatibilizer composition can negatively influence the viscosity of the lubricant, which can lead to inadequate lubrication and stress on, or mechanical failure of, the compressor. Further, compatibilizer concentrations higher than about 50 weight percent of the combined lubricant and compatibilizer composition can negatively influence the refrigeration capacity and performance of a refrigerant composition in a compression refrigeration system. An effective amount of compatibilizer in the present compositions leads to halogenated hydrocarbon and lubricant becoming solubilized to the extent that adequate return of lubricant in a compression refrigeration system from non-compressor zones (e.g. evaporator or condenser) to the compressor zone is obtained.

Halogenated hydrocarbon refrigerants of the present invention contain at least one carbon atom and one fluorine atom. Of particular utility are halogenated hydrocarbons having 1–6 carbon atoms containing at least one fluorine atom, optionally containing chlorine and oxygen atoms, and having a normal boiling point of from −90° C. to 80° C. These halogenated hydrocarbons may be represented by the general formula $C_wF_{2w+2-x-y}H_xCl_yO_z$, wherein w is 1–6, x is 1–9, y is 0–3, and z is 0–2. Preferred of the halogenated hydrocarbons are those in which w is 1–6, x is 1–5, y is 0–1, and z is 0–1. The present invention is particularly useful with hydrofluorocarbon and hydrochlorofluorocarbon-based refrigerants. Halogenated hydrocarbon refrigerants are commercial products available from a number of sources such as E. I. du Pont de Nemours & Co., Fluoroproducts, Wilmington, Del., 19898, USA, or are available from custom chemical synthesis companies such as PCR Inc., P.O. Box 1466, Gainesville, Fla., 32602, USA, and additionally by synthetic processes disclosed in art such as The Journal of Fluorine Chemistry, or Chemistry of Organic Fluorine Compounds, edited by Milos Hudlicky, published by The MacMillan Company, New York, N.Y., 1962. Representative halogenated hydrocarbons include: $CHClF_2$ (HCFC-22), $CHF_3$ (HFC-23), $CH_2F_2$ (HFC-32), $CH_3F$ (HFC-41), $CF_3CF_3$ (FC-116), $CHClFCF_3$ (HCFC-124), $CHF_2CF_3$ (HFC-125), $CH_2ClCF_3$ (HCFC-133a), $CHF_2CHF_2$ (HFC-134), $CH_2FCF_3$ (HFC-134a), $CClF_2CH_3$ (HCFC-142b), $CHF_2CH_2F$ (HFC-143), $CF_3CH_3$ (HFC-143a), $CHF_2CH_3$ (HFC-152a), $CHF_2CF_2CF_3$ (HFC-227ca), $CF_3CFHCF_3$ (HFC-227ea), (HFC-236ca), $CH_2FCF_2CF_3$ (HFC-236cb), $CHF_2CHFCF_3$ (HFC-236ea), $CF_3CH_2CF_3$ (HFC-236fa), $CH_2FCF_2CHF_2$ (HFC-245ca), $CH_3CF_2CF_3$ (HFC-245cb), $CHF_2CHFCHF_2$ (HFC-245ea), $CH_2FCHFCF_3$ (HFC-245eb), $CHF_2CH_2CF_3$ (HFC-245fa), $CH_2FCF_2CH_2F$ (HFC-254ca), $CH_2CF_2CHF_2$ (HFC-254cb), $CH_2FCHFCHF_2$ (HFC-254ea), $CH_3CHFCF_3$ (HFC-254eb), $CHF_2CH_2CHF_2$ (HFC-254fa), $CH_2FCH_2CF_3$ (HFC-254fb), $CH_3CF_2CH_3$ (HFC-272ca), $CH_3CHFCH_2F$ (HFC-272ea), $CH_2FCH_2CH_2F$ (HFC-272fa), $CH_3CH_2CF_2H$ (HFC-272fb), $CH_3CHFCH_3$ (HFC-281ea), $CH_3CH_2CH_2F$ (HFC-281fa), $CHF_2CF_2CF_2CF_2H$ (HFC-338pcc), $CF_3CHFCHFCF_2CF_3$ (HFC-43-10mee), $C_4F_9OCH_3$, and $C_4F_9OC_2H_5$.

The present invention is particularly useful with the hydrofluorocarbon and hydrochlorofluorocarbon-based refrigerants, such as, $CHClF_2$ (HCFC-22), $CHF_3$ (HFC-23), $CH_2F_2$ (HFC-32), $CHClFCF_3$ (HCFC-124), $CHF_2CF_3$ (HFC-125), $CHF_2CHF_2$ (HFC-134), $CH_2FCF_3$ (HFC-134a), $CF_3CH_3$ (HFC-143a), $CHF_2CH_3$ (HFC-152a), $CHF_2CF_2CF_3$ (HFC-227ca), $CF_3CFHCF_3$ (HFC-227ea), $CF_3CH_2CF_3$ (HFC-236fa), $CHF_2CH_2CF_3$ (HFC-245fa), $CHF_2CF_2CF_2CF_2H$ (HFC-338pcc), $CF_3CHFCHFCF_2CF_3$ (HFC-43-10mee); and the azeotropic and azeotrope-like halogenated hydrocarbon refrigerant compositions, such as, HCFC-22/HFC-152a/HCFC-124 (known by the ASHRAE designations, R-401A, R-401B, and R-401C), HFC-125/HFC-143a/HFC-134a (known by the ASHRAE designation, R-404A), HFC-32/HFC-125/HFC-134a (known by ASHRAE designations, R-407A, R-407B, and R-407C), HCFC-22/HFC-143a/HFC-125 (known by the ASHRAE designation, R-408A), HCFC-22/HCFC-124/HCFC-142b (known by the ASHRAE designation: R-409A), HFC-32/HFC-125 (R-410A), and HFC-125/HFC-143a (known by the ASHRAE designation: R-507).

The halogenated hydrocarbons of the present invention may optionally further comprise up to 10 weight percent of dimethyl ether, or at least one $C_3$ to $C_5$ hydrocarbon, e.g., propane, propylene, cyclopropane, n-butane, i-butane, and n-pentane. Examples of halogenated hydrocarbons containing such $C_3$ to $C_5$ hydrocarbons are azeotrope-like compositions of HCFC-22/HFC-125/propane (known by the ASHRAE designation, R-402A and R-402B) and HCFC-22/octafluoropropane/propane (known by the ASHRAE designation, R-403A and R-403B).

Lubricants of the present invention are those conventionally used in compression refrigeration apparatus utilizing chlorofluorocarbon refrigerants. Such lubricants and their properties are discussed in the 1990 ASHRAE Handbook, Refrigeration Systems and Applications, chapter 8, titled "Lubricants in Refrigeration Systems", pages 8.1 through 8.21, herein incorporated by reference. Lubricants of the present invention are selected by considering a given compressor's requirements and the environment to which the lubricant will be exposed. Lubricants of the present invention preferrably have a kinematic viscosity of at least about 15 cs (centistokes) at 40° C. Lubricants of the present invention comprise those commonly known as "mineral oils" in the field of compression refrigeration lubrication. Mineral oils comprise paraffins (i.e. straight-chain and branched-carbon-chain, saturated hydrocarbons), napthenes (i.e. cyclic paraffins) and aromatics (i.e. unsaturated, cyclic hydrocarbons containing one or more rings characterized by alternating double bonds). Lubricants of the present invention further comprise those commonly known as "synthetic oils" in the field of compression refrigeration lubrication. Synthetic oils comprise alkylaryls (i.e. linear and branched alkyl alkylbenzenes), synthetic paraffins and napthenes, and poly(alphaolefins). Representative conventional lubricants of the present invention are the commercially available BVM 100 N (paraffinic mineral oil sold by BVA Oils), Suniso® 3GS (napthenic mineral oil sold by Crompton Co.), Sontex® 372LT (napthenic mineral oil sold by Pennzoil), Calumet® RO-30 (napthenic mineral oil sold by Calument Lubricants), Zerol® 75 and Zerol® 150 (linear alkylbenzenes sold by Shrieve Chemicals) and HAB 22 (branched alkylbenzene sold by Nippon Oil).

Compatibilizers of the present invention comprise polyoxyalkylene glycol ethers represented by the formula $R^1[(OR^2)_xOR^3]_y$, wherein: x is selected from integers from 1–3; y is selected from integers from 1–4; $R^1$ is selected from hydrogen and aliphatic hydrocarbon radicals having 1 to 6 carbon atoms and y bonding sites; $R^2$ is selected from aliphatic hydrocarbylene radicals having from 2 to 4 carbon atoms; $R^3$ is selected from hydrogen and aliphatic and alicyclic hydrocarbon radicals having from 1 to 6 carbon atoms; at least one of $R^1$ and $R^3$ is said hydrocarbon radical; and wherein said polyoxyalkylene glycol ethers have a molecular weight of from about 100 to about 300 atomic mass units and a carbon to oxygen ratio of from about 2.3 to about 5.0. In the present polyoxyalkylene glycol ether compatibilizers represented by $R^1[(OR^2)_xOR^3]_y$: x is preferably 1–2; y is preferably 1; $R^1$ and $R^3$ are preferably independently selected from hydrogen and aliphatic hydrocarbon radicals having 1 to 4 carbon atoms; $R^2$ is preferably selected from aliphatic hydrocarbylene radicals having from 2 or 3 carbon atoms, most preferably 3 carbon atoms; the polyoxyalkylene glycol ether molecular weight is preferably from about 100 to about 250 atomic mass units, most preferably from about 125 to about 250 atomic mass units; and the polyoxyalkylene glycol ether carbon to oxygen ratio is preferably from about 2.5 to 4.0 when hydrofluorocarbons are used as halogenated hydrocarbon refrigerant, most preferably from about 2.7 to about 3.5 when hydrofluorocarbons are used as halogenated hydrocarbon refrigerant, and preferably from about 3.5 to 5.0 when hydrochlorofluorocarbon-containing refrigerants are used as halogenated hydrocarbon refrigerant, most preferably from about 4.0 to about 4.5 when hydrochlorofluorocarbon-containing refrigerants are used as halogenated hydrocarbon refrigerant. The $R^1$ and $R^3$ hydrocarbon radicals having 1 to 6 carbon atoms may be linear, branched or cyclic. Representative $R^1$ and $R^3$ hydrocarbon radicals include methyl, ethyl, propyl, isopropyl, butyl, isobutyl, sec-butyl, tert-butyl, pentyl, isopentyl, neopentyl, tert-pentyl, cyclopentyl, and cyclohexyl. Where free hydroxyl radicals on the present polyoxyalkylene glycol ether compatibilizers may be incompatible with certain compression refrigeration apparatus materials of construction (e.g. Mylaru®), $R^1$ and $R^3$ are preferably aliphatic hydrocarbon radicals having 1 to 4 carbon atoms, most preferably 1 carbon atom. The $R^2$ aliphatic hydrocarbylene radicals having from 2 to 4 carbon atoms form repeating oxyalkylene radicals $—(OR^2)_x—$ that include oxyethylene radicals, oxypropylene radicals, and oxybutylene radicals. The oxyalkylene radical comprising $R^2$ in one polyoxyalkylene glycol ether compatibilizer molecule may be the same, or one molecule may contain different $R^2$ oxyalkylene groups. The present polyoxyalkylene glycol ether compatibilizers preferably comprise at least one oxypropylene radical. Where $R^1$ is an aliphatic or alicyclic hydrocarbon radical having 1 to 6 carbon atoms and y bonding sites, the radical may be linear, branched or cyclic. Representative $R^1$ aliphatic hydrocarbon radicals having two bonding sites include, for example, an ethylene radical, a propylene radical, a butylene radical, a pentylene radical, a hexylene radical, a cyclopentylene radical and a cyclohexylene radical. Representative $R^1$ aliphatic hydrocarbon radicals having three or four bonding sites include residues derived from polyalcohols, such as trimethylolpropane, glycerin, pentaerythritol, 1,2,3-trihydroxycyclohexane and 1,3,5-trihydroxycyclohexane, by removing their hydroxyl radicals. Representative polyoxyalkylene glycol ether compatibilizers include: $CH_3OCH_2CH(CH_3)O(H$ or $CH_3)$ (propylene glycol methyl (or dimethyl) ether), $CH_3O[CH_2CH(CH_3)O]_2(H$ or $CH_3)$ (dipropylene glycol methyl (or dimethyl) ether), $CH_3O[CH_2CH(CH_3)O]_3(H$ or $CH_3)$ (tripropylene glycol methyl (or dimethyl) ether), $C_2H_5OCH_2CH(CH_3)O(H$ or $C_2H_5)$ (propylene glycol ethyl (or diethyl) ether), $C_2H_5O[CH_2CH(CH_3)O]_2(H$ or $C_2H_5)$ (dipropylene glycol ethyl (or diethyl) ether), $C_2H_5O[CH_2CH(CH_3)O]_3(H$ or $C_2H_5)$ (tripropylene glycol ethyl (or diethyl) ether), $C_3H_7OCH_2CH(CH_3)O(H$ or $C_3H_7)$ (propylene glycol n-propyl (or di-n-propyl) ether), $C_3H_7O[CH_2CH(CH_3)O]_2(H$ or $C_3H_7)$ (dipropylene glycol n-propyl (or di-n-propyl) ether), $C_3H_7O[CH_2CH(CH_3)O]_3(H$ or $C_3H_7)$ (tripropylene glycol n-propyl (or di-n-propyl) ether), $C_4H_9OCH_2CH(CH_3)OH$ (propylene glycol n-butyl ether), $C_4H_9O[CH_2CH(CH_3)O]_2(H$ or $C_4H_9)$ (dipropylene glycol n-butyl (or di-n-butyl) ether), $C_4H_9O[CH_2CH(CH_3)O]_3(H$ or $C_4H_9)$ (tripropylene glycol n-butyl (or di-n-butyl) ether), $(CH_3)_3COCH_2CH(CH_3)OH$ (propylene glycol t-butyl ether), $(CH_3)_3CO[CH_2CH(CH_3)O]_2(H$ or $(CH_3)_3)$ (dipropylene glycol t-butyl (or di-t-butyl) ether), $(CH_3)_3CO[CH_2CH(CH_3)O]_3(H$ or $(CH_3)_3)$ (tripropylene glycol t-butyl (or di-t-butyl) ether), $C_5H_{11}OCH_2CH(CH_3)OH$ (propylene glycol n-pentyl ether), $C_4H_9OCH_2CH(C_2H_5)OH$ (butylene glycol n-butyl ether), $C_4H_9O[CH_2CH(C_2H_5)O]_2H$ (dibutylene glycol n-butyl ether), trimethylolpropane tri-n-butyl ether $(C_2H_5C(CH_2O(CH_2)_3CH_3)_3)$ and trimethylolpropane di-n-butyl ether $(C_2H_5C(CH_2OC(CH_2)_3CH_3)_2CH_2OH)$.

Compatibilizers of the present invention further comprise amides represented by the formulae $R^1CONR^2R^3$ and cyclo-$[R^4CON(R^5)\text{---}]$, wherein $R^1$, $R^2$, $R^3$ and $R^5$ are independently selected from aliphatic and alicyclic hydrocarbon radicals having from 1 to 12 carbon atoms; $R^4$ is selected from aliphatic hydrocarbylene radicals having from 3 to 12 carbon atoms; and wherein said amides have a molecular weight of from about 120 to about 300 atomic mass units and a carbon to oxygen ratio of from about 7 to about 20. The molecular weight of said amides is preferably from about 160 to about 250 atomic mass units. The carbon to oxygen ratio in said amides is preferably from about 7 to about 16, and most preferably from about 10 to about 14. $R^1$, $R^2$, $R^3$ and $R^5$ may optionally include substituted hydrocarbon radicals, that is, radicals containing non-hydrocarbon substituents selected from halogens (e.g., fluorine, chlorine) and alkoxides (e.g. methoxy). $R^1$, $R^2$, $R^3$ and $R^5$ may optionally include heteroatom-substituted hydrocarbon radicals, that is, radicals which contain the atoms nitrogen (aza-), oxygen (oxa-) or sulfur (thia-) in a radical chain otherwise composed of carbon atoms. In general, no more than three non-hydrocarbon substituents and heteroatoms, and preferably no more than one, will be present for each 10 carbon atoms in $R^{1-3}$, and the presence of any such non-hydrocarbon substituents and heteroatoms must be considered in applying the aforementioned ratio of carbon to oxygen and molecular weight limitations. Preferred amide compatibilizers consist of carbon, hydrogen, nitrogen and oxygen. Representative $R^1$, $R^2$, $R^3$ and $R^5$ aliphatic and alicyclic hydrocarbon radicals include methyl, ethyl, propyl, isopropyl, butyl, isobutyl, sec-butyl, tert-butyl, pentyl, isopentyl, neopentyl, tert-pentyl, cyclopentyl, cyclohexyl, heptyl, octyl, nonyl, decyl, undecyl, dodecyl and their configurational isomers. A preferred embodiment of amide compatibilizers are those wherein $R^4$ in the aforementioned formula cyclo-$[R^4CON(R^5)\text{---}]$ may be represented by the hydrocarbylene radical $(CR^6R^7)n$, in other words, the formula: cyclo-$[(CR^6R^7)_nCON(R^5)\text{---}]$ wherein: the previously-stated values for (a) ratio of carbon to oxygen and (b) molecular weight apply; n is an integer from 3 to 5; $R^5$ is a saturated hydrocarbon radical containing 1 to 12 carbon atoms; $R^6$ and $R^7$ are independently selected (for each n) by the rules previously offered defining $R^{1-3}$. In the lactams represented by the formula: cyclo-$[(CR^6R^7)_nCON(R^5)\text{---}]$, all $R^6$ and $R^7$ are preferably hydrogen, or contain a single saturated hydrocarbon radical among the n methylene units, and $R^5$ is a saturated hydrocarbon radical containing 3 to 12 carbon atoms. For example, 1-(saturated hydrocarbon radical)-5-methylpyrrolidin-2-ones. Representative amide compatibilizers include: 1-octylpyrrolidin-2-one, 1-decylpyrrolidin-2-one, 1-octyl-5-methylpyrrolidin-2-one, 1-butylcaprolactam, 1-cyclohexylpyrrolidin-2-one, 1-butyl-5-methylpiperid-2-one, 1-pentyl-5-methylpiperid-2-one, 1-hexylcaprolactam, 1-hexyl-5-methylpyrrolidin-2-one, 5-methyl-1-pentylpiperid-2-one, 1,3-dimethylpiperid-2-one, 1-methylcaprolactam, 1-butyl-pyrrolidin-2-one, 1,5-dimethylpiperid-2-one, 1-decyl-5-methylpyrrolidin-2-one, 1-dodecylpyrrolid-2-one, N,N-dibutylformamide and N,N-diisopropylacetamide.

Compatibilizers of the present invention further comprise ketones represented by the formula $R^1COR^2$, wherein $R^1$ and $R^2$ are independently selected from aliphatic, alicyclic and aryl hydrocarbon radicals having from 1 to 12 carbon atoms, and wherein said ketones have a molecular weight of from about 70 to about 300 atomic mass units and a carbon to oxygen ratio of from about 4 to about 13. $R^1$ and $R^2$ in said ketones are preferably independently selected from aliphatic and alicyclic hydrocarbon radicals having 1 to 9 carbon atoms. The molecular weight of said ketones is preferably from about 100 to 200 atomic mass units. The carbon to oxygen ratio in said ketones is preferably from about 7 to about 10. $R^1$ and $R^2$ may together form a hydrocarbylene radical connected and forming a five, six, or seven-membered ring cyclic ketone, for example, cyclopentanone, cyclohexanone, and cycloheptanone. $R^1$ and $R^2$ may optionally include substituted hydrocarbon radicals, that is, radicals containing non-hydrocarbon substituents selected from halogens (e.g., fluorine, chlorine) and alkoxides (e.g. methoxy). $R^1$ and $R^2$ may optionally include heteroatom-substituted hydrocarbon radicals, that is, radicals which contain the atoms nitrogen (aza-), oxygen (keto-, oxa-) or sulfur (thia-) in a radical chain otherwise composed of carbon atoms. In general, no more than three non-hydrocarbon substituents and heteroatoms, and preferably no more than one, will be present for each 10 carbon atoms in $R^1$ and $R^2$, and the presence of any such non-hydrocarbon substituents and heteroatoms must be considered in applying the aforementioned ratio of carbon to oxygen and molecular weight limitations. Representative $R^1$ and $R^2$ aliphatic, alicyclic and aryl hydrocarbon radicals in the general formula $R^1COR^2$ include methyl, ethyl, propyl, isopropyl, butyl, isobutyl, sec-butyl, tert-butyl, pentyl, isopentyl, neopentyl, tert-pentyl, cyclopentyl, cyclohexyl, heptyl, octyl, nonyl, decyl, undecyl, dodecyl and their configurational isomers, as well as phenyl, benzyl, cumenyl, mesityl, tolyl, xylyl and phenethyl. Representative ketone compatibilizers include: 2-butanone, 2-pentanone, acetophenone, butyrophenone, hexanophenone, cyclohexanone, cycloheptanone, 2-heptanone, 3-heptanone, 5-methyl-2-hexanone, 2-octanone, 3-octanone, diisobutyl ketone, 4-ethylcyclohexanone, 2-nonanone, 5-nonanone, 2-decanone, 4-decanone, 2-decalone, 2-tridecanone, dihexyl ketone and dicyclohexyl ketone.

Compatibilizers of the present invention further comprise nitriles represented by the formula $R^1CN$, wherein $R^1$ is selected from aliphatic, alicyclic or aryl hydrocarbon radicals having from 5 to 12 carbon atoms, and wherein said nitriles have a molecular weight of from about 90 to about 200 atomic mass units and a carbon to nitrogen ratio of from about 6 to about 12. $R^1$ in said nitrile compatibilizers is preferably selected from aliphatic and alicyclic hydrocarbon radicals having 8 to 10 carbon atoms. The molecular weight of said nitrile compatibilizers is preferably from about 120 to about 140 atomic mass units. The carbon to nitrogen ratio in said nitrile compatibilizers is preferably from about 8 to about 9. $R^1$ may optionally include substituted hydrocarbon radicals, that is, radicals containing non-hydrocarbon substituents selected from halogens (e.g., fluorine, chlorine) and alkoxides (e.g. methoxy). $R^1$ may optionally include heteroatom-substituted hydrocarbon radicals, that is, radicals which contain the atoms nitrogen (aza-), oxygen (keto-, oxa-) or sulfur (thia-) in a radical chain otherwise composed of carbon atoms. In general, no more than three non-hydrocarbon substituents and heteroatoms, and preferably no more than one, will be present for each 10 carbon atoms in $R^1$, and the presence of any such non-hydrocarbon substituents and heteroatoms must be considered in applying the aforementioned ratio of carbon to nitrogen and molecular weight limitations. Representative $R^1$ aliphatic, alicyclic and aryl hydrocarbon radicals in the general formula $R^1CN$ include include pentyl, isopentyl, neopentyl, tert-pentyl, cyclopentyl, cyclohexyl, heptyl, octyl, nonyl, decyl, undecyl, dodecyl and their configurational isomers, as well as phenyl, benzyl, cumenyl, mesityl, tolyl, xylyl and phenethyl. Representative nitrile compatibilizers include: 1-cyanopentane, 2,2-dimethyl-4-cyanopentane, 1-cyanohexane, 1-cyanoheptane, 1-cyanooctane, 2-cyanooctane, 1-cyanononane, 1-cyanodecane, 2-cyanodecane, 1-cyanoundecane and 1-cyanododecane. Nitrile compatibilizers are especially useful in compatibilizing HFC refrigerants with aromatic and alkylaryl lubricants.

Compatibilizers of the present invention further comprise chlorocarbons represented by the formula $RCl_x$, wherein; x is selected from the integers 1 or 2; R is selected from aliphatic and alicyclic hydrocarbon radicals having 1 to 12 carbon atoms; and wherein said chlorocarbons have a molecular weight of from about 100 to about 200 atomic mass units and carbon to chlorine ratio from about 2 to about 10. The molecular weight of said chlorocarbon compatibilizers is preferably from about 120 to 150 atomic mass units. The carbon to chlorine ratio in said chlorocarbon compatibilizers is preferably from about 6 to about 7. Representative R aliphatic and alicyclic hydrocarbon radicals in the general formula $RCl_x$ include methyl, ethyl, propyl, isopropyl, butyl, isobutyl, sec-butyl, tert-butyl, pentyl, isopentyl, neopentyl, tert-pentyl, cyclopentyl, cyclohexyl, heptyl, octyl, nonyl, decyl, undecyl, dodecyl and their configurational isomers. Representative chlorocarbon compatibilizers include: 3-(chloromethyl)pentane, 3-chloro-3-methylpentane, 1-chlorohexane, 1,6-dichlorohexane, 1-chloroheptane, 1-chlorooctane, 1-chlorononane, 1-chlorodecane, and 1,1,1-trichlorodecane.

Compatibilizers of the present invention further comprise aryl ethers represented by the formula $R^1OR^2$, wherein: $R^1$ is selected from aryl hydrocarbon radicals having from 6 to 12 carbon atoms; $R^2$ is selected from aliphatic hydrocarbon radicals having from 1 to 4 carbon atoms; and wherein said aryl ethers have a molecular weight of from about 100 to about 150 atomic mass units and a carbon to oxygen ratio of from about 4 to about 20. The carbon to oxygen ratio in said aryl ether compatibilizers is preferably from about 7 to about 10. Representative $R^1$ aryl radicals in the general formula $R^1OR^2$ include phenyl, biphenyl, cumenyl, mesityl, tolyl, xylyl, naphthyl and pyridyl. Representative $R^2$ aliphatic hydrocarbon radicals in the general formula $R^1OR^2$ include methyl, ethyl, propyl, isopropyl, butyl, isobutyl, sec-butyl and tert-butyl. Representative aromatic ether compatibilizers include: methyl phenyl ether (anisole), 1,3-dimethyoxybenzene, ethyl phenyl ether and butyl phenyl ether.

Compatibilizers of the present invention further comprise 1,1,1-trifluoroalkanes represented by the general formula $CF_3R^1$, wherein $R^1$ is selected from aliphatic and alicyclic hydrocarbon radicals having from about 5 to about 15 carbon atoms, preferably primary, linear, saturated, alkyl radicals. Representative 1,1,1-trifluoroalkane compatibilizers include: 1,1,1-trifluorohexane and 1,1,1-trifluorododecane.

Compatibilizers of the present invention further comprise fluoroethers represented by the general formula $R^1OCF_2CF_2H$, wherein $R^1$ is selected from aliphatic and alicyclic hydrocarbon radicals having from about 5 to about 15 carbon atoms, preferably primary, linear, saturated, alkyl radicals. Representative fluoroether compatibilizers include: $C_8H_{17}OCF_2CF_2H$ and $C_6H_{13}OCF_2CF_2H$.

Compatibilizers of the present invention may comprise a single compatibilizer species or multiple compatibilizer species together in any proportion. For example, a compatibilizer may comprise a mixture of compounds from within a single compatibilizer species (e.g. a mixture of polyoxyalkylene glycol ethers) or a mixture of compounds chosen from different compatibilizer species (e.g. a mixture of a polyoxyalkylene glycol ether with a ketone).

Compatibilizer of the present invention may optionally further comprise from about 1 to about 50 weight percent, preferably from about 1 to about 10 weight percent based on total amount of compatibilizer, of an ester containing the functional group —$CO_2$— and having a carbon to ester functional group carbonyl oxygen ratio of from about 2 to about 6. The optional esters may be represented by the general formula $R^1CO_2R^2$, wherein $R^1$ and $R^2$ are independently selected from linear and cyclic, saturated and unsaturated, alkyl and aryl radicals. $R^1$ and $R^2$ are optionally connected forming a ring, such as a lactone. Preferred optional esters consist essentially of the elements C, H and O having a molecular weight of from about 80 to about 550 atomic mass units. Representative optional esters include: $(CH_3)_2CHCH_2OOC(CH_2)_{2-4}OCOCH_2CH(CH_3)_2$ (diisobutyl dibasic ester), ethyl hexanoate, ethyl heptanoate, n-butyl proprionate, n-propyl proprionate, ethyl benzoate, di-n-propyl phthalate, benzoic acid ethoxyethyl ester, dipropyl carbonate, "Exxate 700" (a commercial $C_7$ alkyl acetate), "Exxate 800" (a commercial $C_8$ alkyl acetate), dibutyl phthalate, and t-butyl acetate.

Compatibilizer of the present invention may optionally further comprise at least one polyvinyl ether polymer, including polyvinyl ether homopolymers, polyvinyl ether copolymers, and copolymers of vinyl ethers with hydrocarbon alkenes (e.g. ethylene and propylene), and/or functionalized hydrocarbon alkenes (e.g., vinyl acetate and styrene). A representative polyvinyl ether is PVE 32, sold by Idemitsu Kosan and having a kinematic viscosity of 32 cs at 40° C.

Compatibilizers of the present invention may optionally further comprise from about 0.5 to about 50 weight percent (based on total amount of compatibilizer) of a linear or cyclic aliphatic or aromatic hydrocarbon containing from 5 to 15 carbon atoms. Representative hydrocarbons include pentane, hexane, octane, nonane, decane, Isopar® H (a high purity $C_{11}$ to $C_{12}$ isoparaffinic), Aromatic 150 (a $C_9$ to $C_{11}$ aromatic), Aromatic 200 (a $C_9$ to $C_{15}$ aromatic) and Naptha 140. All of these hydrocarbons are sold by Exxon Chemical, USA.

Compatibilizers of the present invention may optionally further contain from about 0.01 to 30 weight percent (based on total amount of compatibilizer) of an additive which reduces the surface energy of metallic copper, aluminum, steel, or other metals found in heat exchangers in a way that reduces the adhesion of lubricants to the metal. Examples of metal surface energy reducing additives include those disclosed in WIPO PCT publication WO 96/7721, such as Zonyl® FSA, Zonyl® FSP and Zonyl® FSj, all products of E. I. du Pont de Nemours and Co. In practice, by reducing the adhesive forces between the metal and the lubricant (i.e. substituting for a compound more tightly bound to the metal), the lubricant circulates more freely through the heat exchangers and connecting tubing in an air conditioning or refrigeration system, instead of remaining as a layer on the surface of the metal. This allows for the increase of heat transfer to the metal and allows efficient return of lubricant to the compressor.

Commonly used refrigeration system additives may optionally be added, as desired, to compositions of the present invention in order to enhance lubricity and system stability. These additives are generally known within the field of refrigeration compressor lubrication, and include anti wear agents, extreme pressure lubricants, corrosion and oxidation inhibitors, metal surface deactivators, free radical scavengers, foam control agents, and the like. In general, these additives are present only in small amounts relative to the overall lubricant composition. They are typically used at concentrations of from less than about 0.1% to as much as about 3% of each additive. These additives are selected on the basis of the individual system requirements. Some typical examples of such additives may include, but are not limited to, lubrication enhancing additives, such as alkyl or aryl esters of phosphoric acid and of thiophosphates. These include members of the triaryl phosphate family of EP lubricity additives, such as butylated triphenyl phosphates (BTPP), or other alkylated triaryl phosphate esters, e.g. Syn-0-Ad 8478 from Akzo Chemicals, tricrecyl phosphates and related compounds. Additionally, the metal dialkyl dithiophosphates (e.g. zinc dialkyl dithiophosphate or ZDDP, Lubrizol 1375) and other members of this family of chemicals may be used in compositions of the present invention. Other antiwear additives include natural product oils and assymetrical polyhydroxyl lubrication additives such as Synergol TMS (International Lubricants). Similarly, stabilizers such as anti oxidants, free radical scavengers, and water scavengers may be employed. Compounds in this category can include, but are not limited to, butylated hydroxy toluene (BHT) and epoxides.

Compatiblizers such as ketones may have an objectionable odor which can be masked by addition of an odor masking agent or fragrance. Typical examples of odor masking agents or fragrances may include Evergreen, Fresh Lemon, Cherry, Cinnamon, Peppermint, Floral or Orange Peel or sold by Intercontinental Fragrance, as well as d-limonene and pinene. Such odor masking agents may be used at concentrations of from about 0.001% to as much as about 15% by weight based on the combined weight of odor masking agent and compatibilizer.

The present invention further comprises processes for producing refrigeration comprising evaporating the present halogenated hydrocarbon-containing refrigeration compositions in the vicinity of a body to be cooled, and processes for producing heat comprising condensing halogenated hydrocarbon refrigerant in the presence of lubricant and compatibilizer in the presence of a body to be heated.

The present invention further comprises processes for solubilizing a halogenated hydrocarbon refrigerant in a lubricant, comprising contacting the halogenated hydrocarbon refrigerant with the lubricant in the presence of an effective amount of compatibilizer, which forms a solution of the halogenated hydrocarbon refrigerant and the lubricant.

The present invention further relates to processes for returning lubricant from a non-compressor zone to a compressor zone in a compression refrigeration system comprising:

(a) contacting the lubricant in the non-compressor zone with at least one halogenated hydrocarbon refrigerant in the presence of an effective amount of compatibilizer; and (b) returning the lubricant from the noncompressor zone to the compressor zone of the refrigeration system.

The present invention further comprises processes for returning a lubricant from a low pressure zone to a compressor zone in a refrigeration system, comprising:

(a) contacting the lubricant in the low pressure zone of the refrigeration system with at least one halogenated hydrocarbon refrigerant in the presence of an effective amount of compatibilizer; and (b) returning the lubricant from the low pressure zone to the compressor zone of the refrigeration system.

EXAMPLES

The following examples are provided to illustrate certain aspects of the present invention, and are not intended to limit the scope of the invention.

Herein, all percentages (%) are in weight percentages unless otherwise indicated.

Naptha 140 (paraffins and cycloparaffins with normal boiling point of 188–208° C.), Aromatic 150 (aromatics with normal boiling point 184–204° C.) and Isopar® H (isoparaffins with normal boiling point 161–203° C.) are all products of Exxon Chemicals. Exxate 700 is a $C_7$ alkyl acetate produced by Exxon. "POE 22" is used herein as an abbreviation for Mobil Oil product Arctic EAL22, a polyol ester lubricant having a kinematic viscosity of 22 cs at 40° C. "POE 32" is used herein as an abbreviation for Uniqema product Emkarate RL32, a polyol ester lubricant having a kinematic viscosity of 32 cs at 40° C. Zerol 75 is an alkylbenzene lubricant having a kinematic viscosity of 15 cs at 40° C., Zerol 150 is an alkylbenzene lubricant having a kinematic viscosity of 32 cs at 40° C., Zerol 200 TD is an alkylbenzene lubricant having a kinematic viscosity of 40 cs at 40° C., and Zerol 300 is an alkylbenzene lubricant having a kinematic viscosity of 57 cs at 40° C. The Zerol® products are sold by the Shrieve Corporation. PVE 32 is a polyvinyl ether sold by Idemitsu Kosan having a kinematic viscosity of 32 cs at 40° C. Ucon LB-65 is a polyoxyproplyene glycol lubricant sold by Union Carbide with an average molecular weight of about 340. Ucon 50-HB-100 is a lubricant containing equal amounts of oxyethylene and oxpropylene groups sold by Union Carbide with an average molecular weight of about 520. Ucon 488 is a Union Carbide product having a kinematic viscosity of 130 cs at 40° C. Suniso® 3GS (sometimes herein abbreviated as "3GS") is a napthenic mineral oil with a kinematic viscosity of 33 cs at 40° C., Suniso® 4GS (sometimes herein abbreviated as "4GS") is a napthenic mineral oil with a kinematic viscosity of 62 cs at 40° C. The Suniso® products are sold by Crompton Corporation. HAB 22 has a kinematic viscosity of 22 cs at 40° C. and is a branched alkylbenzene oil sold by Nippon Oil.

HCFC-22 is chlorodifluoromethane. HFC-134a is 1,1,1,2-tetrafluoroethane. R401A is a refrigerant blend containing 53 wt % HCFC-22, 13 wt % HFC-152a (1,1-difluoroethane) and 34 wt % HCFC-124 (2-chloro-1,1,1,2-tetrafluoroethane). R404A is a refrigerant blend containing 44 wt % HFC-125 (pentafluoroethane), 52 wt % HFC-143a (1,1,1-trifluoroethane) and 4 wt % HFC-134a. R407C is a refrigerant blend containing 23 wt % HFC-32 (difluoromethane), 25 wt % HFC-125 and 52 wt % HFC-134a. R410A is a refrigerant blend containing 50 wt % HFC-32 and 50 wt % HFC-125.

Abbreviations used herein for a number of materials are shown in the table below with the corresponding material name, and if relevant, formula and molecular weight:

| Abbreviation | Material | Formula | Molecular Weight |
|---|---|---|---|
| BnB | Butylene glycol n-butyl ether | $C_4H_9OCH_2CHOHCH_2CH_3$ | 146 |
| PnB | Propylene glycol n-butyl ether | $C_4H_9OCH_2CHOHCH_3$ | 132 |
| DPnB | Dipropylene glycol n-butyl ether | $C_4H_9O[CH_2CH(CH_3)O]_2H$ | 190 |
| TPnB | Tripropylene glycol n-butyl ether | $C_4H_9O[CH_2CH(CH_3)O]_3H$ | 248 |
| PnP | Propylene glycol n-propyl ether | $C_3H_7OCH_2CHOHCH_3$ | 118 |
| DPnP | Dipropylene glycol n-propyl ether | $C_3H_7O[CH_2CH(CH_3)O]_2H$ | 176 |
| DPM | Dipropylene glycol methyl ether | $CH_3O[CH_2CH(CH_3)O]_2H$ | 148 |
| DMM | Dipropylene glycol dimethyl ether | $CH_3O[CH_2CH(CH_3)O]_2CH_3$ | 162 |
| PGH | Propylene glycol hexyl ether | $C_6H_{13}OCH_2CHOHCH_3$ | 160 |
| EGO | Ethylene glycol octyl ether | $C_8H_{17}OCH_2CH_2OH$ | 174 |
| PTB | Propylene glycol t-butyl ether | $C(CH_3)_3OCH(CH_3)CH_2OH$ | 132 |
| 1,5-DMPD | 1,5-dimethyl piperidone | $C_7H_{13}NO$ | 127 |
| DMPD | Mixture of 70 wt % 1,3- and 30 wt % 1,5-dimethyl piperid-2-one | $C_7H_{13}NO$ | 127 |
| OP | 1-octyl pyrrolidin-2-one | $C_{12}H_{23}NO$ | 197 |
| DBE-IB | Diisobutyl dibasic esters (e.g. diisobutyl esters of succinic, glutaric and adipic acids) | $(CH_3)_2CHCH_2OOC(CH_2)_{2-4}OCOCH_2CH(CH_3)_2$ | 242 avg. |

Example 1

Polyoxyalkylene glycol ether compatibilizers of the present invention were placed in a suitable container with refrigerant and lubricant and the temperature was lowered until two phases were observed to the naked eye (i.e., the phase separation temperature, also herein referred to as "PST"). The composition in the container was 50 wt % HFC-134a, 25 wt % Zerol 150 and 25 wt % of compatibilizer. Results are shown below, and in FIG. 1.

Example 1

| Compatibilizer | Formula | Phase Separation Temperature (° C.) | Carbon/Oxygen Ratio |
|---|---|---|---|
| Ethylene glycol butyl ether | $C_6H_{14}O_2$ | 4 | 3.0 |
| Ethylene glycol diethyl ether | $C_6H_{14}O_2$ | 5 | 3.0 |
| Ethylene glycol hexyl ether | $C_{10}H_{22}O_2$ | 26 | 4.0 |
| Dipropylene glycol methyl ether | $C_7H_{16}O_3$ | 27 | 2.33 |
| Dipropylene glycol propyl ether | $C_9H_{20}O_3$ | 5.5 | 3.0 |
| Propylene glycol butyl ether | $C_7H_{16}O_2$ | 6 | 3.5 |
| Propylene glycol propyl ether | $C_6H_{14}O_2$ | 11 | 3.0 |
| Tripropylene glycol butyl ether | $C_{13}H_{28}O_4$ | 11 | 3.25 |
| Propylene glycol dimethyl ether | $C_5H_{12}O_2$ | 12 | 2.5 |
| Tripropylene glycol propyl ether | $C_{12}H_{26}O_4$ | 12 | 3.0 |
| Dipropylene glycol dimethyl ether | $C_8H_{18}O_3$ | 13 | 2.67 |
| Dipropylene glycol butyl ether | $C_{10}H_{22}O_3$ | 13 | 3.33 |
| Diethylene glycol butyl ether | $C_8H_{18}O_3$ | 13 | 2.7 |
| Butylene glycol n-butyl ether | $C_8H_{18}O_2$ | 16 | 4 |
| Dibutylene glycol n-butyl ether | $C_{12}H_{26}O_3$ | 18 | 4 |
| Propylene glycol t-butyl ether | $C_7H_{16}O_2$ | 20 | 3.5 |
| Comparative Data | | | |
| Tetraethylene glycol dimethyl ether | $C_{10}H_{22}O_5$ | 32 | 2.0 |
| Ucon LB-65 | polyalkylene glycol | 28 | 3.0 |
| Ucon 50-HB-100 | polyalkylene glycol | 32 | 2.5 |
| PVE 32 | polyvinyl ether | 62 | 5 |
| Dipropylene glycol | $C_6H_{14}O_3$ | not miscible with Zerol 150 | 2 |

The data show significantly lower phase separation temperatures versus 50 wt % HFC-134a/50 wt % Zerol 150 alkylbenzene lubricant which has a phase separation temperature of 137° C. The data show that a minimum phase separation temperature occurs at a specific carbon to oxygen ratio of the polyoxyalkylene glycol ether compatibilizer indicating maximum solubility improvement of hydrofluorocarbon refrigerant in alkylbenzene lubricant.

Example 2

Figure 2:
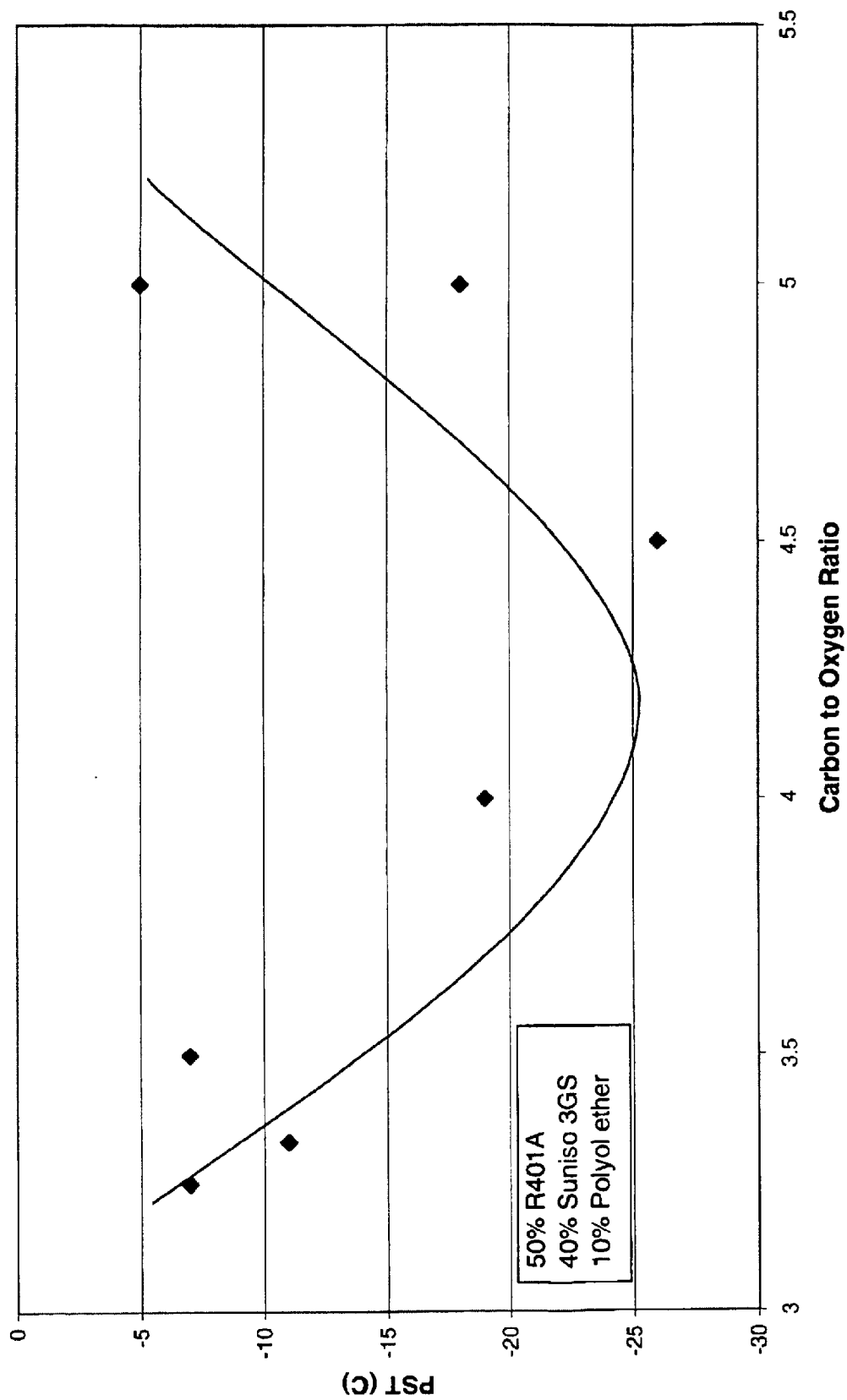
FIG. 2 is a graph of phase separation temperature (° C.) versus carbon to oxygen ratio for various polyoxyalkylene glycol ether compatibilizers (10 wt %), R401A refrigerant (50 wt %) and Suniso® 3GS (mineral oil lubricant from Crompton Co.) (40 wt %).

Polyoxyalkylene glycol ether compatibilizers of the present invention were placed in a suitable container with refrigerant and lubricant and the temperature lowered until two phases were observed. The composition in the container was 50 wt % R401A refrigerant, 40 wt % Suniso 3GS and 10 wt % of a polyoxyalkylene glycol ether compatibilizer. Results are shown below, and in FIG. 2.

Example 2

| Compatibilizer | Formula | Phase Separation Temperature (° C.) | Carbon/Oxygen Ratio |
|---|---|---|---|
| Propylene glycol hexyl ether | $C_9H_{20}O_2$ | −26 | 4.5 |
| Butylene glycol butyl ether | $C_8H_{18}O_2$ | −19 | 4.0 |
| Ethylene glycol octyl ether | $C_{10}H_{22}O_2$ | −18 | 5.0 |
| Propylene glycol butyl ether | $C_7H_{16}O_2$ | −7 | 3.5 |
| Dipropylene glycol butyl ether | $C_{10}H_{22}O_3$ | −11 | 3.33 |
| Tripropylene glycol butyl ether | $C_{13}H_{28}O_4$ | −7 | 3.25 |
| Comparative Data | | | |
| Tetraglyme | $C_{10}H_{22}O_5$ | not miscible with 3GS | 2.0 |

The data show significantly lower phase separation temperature versus 50 wt % R401A refrigerant/50 wt % Suniso 3GS mineral oil, which has a phase separation temperature of 24° C. The data show that a minimum phase separation temperature occurs at a specific carbon to oxygen ratio of the polyoxyalkylene glycol ether compatibilizer, indicating maximum solubility improvement of hydrochlorofluorocarbon-containing refrigerant in mineral oil lubricant.

Butyl phenyl ether ($C_{10}H_{14}O$), an aryl ether compatibilizer, was also measured and showed a surprisingly low phase separation temperature of −32° C.

Example 3

Figure 3:
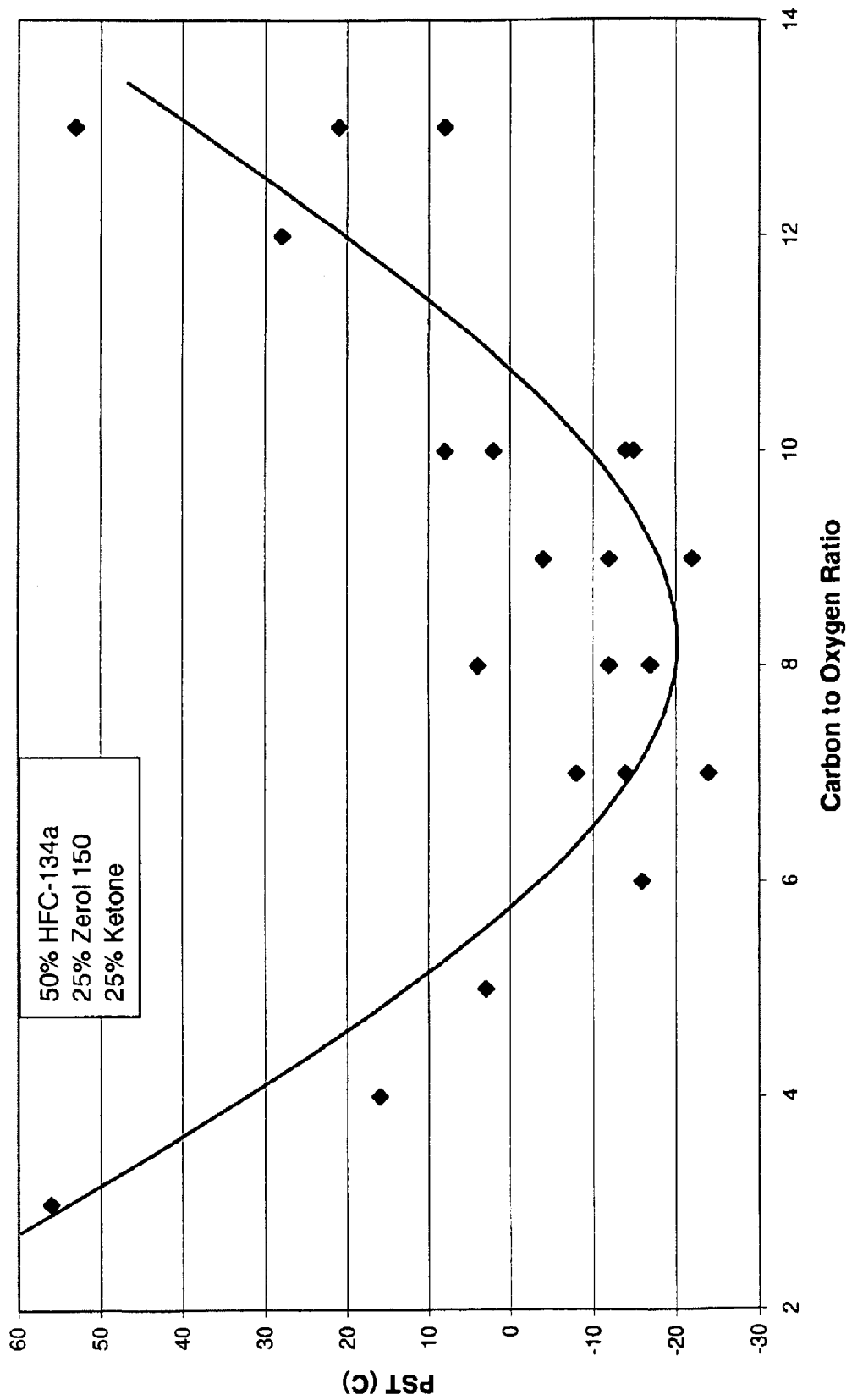
FIG. 3 is a graph of phase separation temperature (° C.) versus carbon to oxygen ratio for various ketone compatibilizers (25 wt %), HFC-134a refrigerant (50 wt %) and Zerol® 150 (25 wt %).

Ketone compatibilizers of the present invention were placed in a suitable container with refrigerant and lubricant and the temperature lowered until two phases were observed. The composition in the container was 50 wt % HFC-134a, 25 wt % Zerol 150 and 25 wt % of a ketone compatibilizer. Results are shown below, and in FIG. 3.

Example 3

| Compatibilizer | Formula | Phase Separation Temperature (° C.) | Carbon/Oxygen Ratio |
|---|---|---|---|
| Cycloheptanone | $C_7H_{12}O$ | −24 | 7 |
| 2-Nonanone | $C_9H_{18}O$ | −22 | 9 |
| 3-Octanone | $C_8H_{16}O$ | −17 | 8 |
| Cyclohexanone | $C_6H_{10}O$ | −16 | 6 |
| 2-Heptanone | $C_7H_{14}O$ | −15 | 7 |
| 2-Decanone | $C_{10}H_{20}O$ | −15 | 10 |
| 4-Decanone | $C_{10}H_{20}O$ | −14 | 10 |
| 2-Octanone | $C_8H_{16}O$ | −12 | 8 |
| 5-Nonanone | $C_9H_{18}O$ | −12 | 9 |
| 4-Ethylcyclohexanone | $C_8H_{14}O$ | −12 | 8 |
| 3-Heptanone | $C_7H_{14}O$ | −8 | 7 |
| Diisobutyl ketone | $C_9H_{18}O$ | −4 | 9 |
| 2-Decalone | $C_{10}H_{16}O$ | 2 | 10 |
| Methyl propyl ketone | $C_5H_{10}O$ | 3 | 5 |
| Acetophenone | $C_8H_8O$ | 4 | 8 |
| Butyrophenone | $C_{10}H_{12}O$ | 8 | 10 |
| 2-tridecanone | $C_{13}H_{26}O$ | 8 | 13 |
| Methyl ethyl ketone | $C_4H_8O$ | 16 | 4 |
| Dihexylketone | $C_{13}H_{26}O$ | 21 | 13 |
| Hexanophenone | $C_{13}H_{18}O$ | 28 | 13 |
| Dicyclohexyl ketone | $C_{13}H_{22}O$ | 53 | 13 |
| Comparative Data | | | |
| Acetone | $C_3H_6O$ | 56 | 3 |

The data show significantly lower phase separation temperatures versus 50 wt % HFC-134a/50 wt % Zerol 150 alkylbenzene lubricant which has a phase separation temperature of 137° C. The data show that a minimum phase separation temperature occurs at a specific carbon to oxygen ratio of the ketone compatibilizer indicating maximum solubility improvement of hydrofluorocarbon refrigerant in alkylbenzene lubricant.

Example 4

Figure 4:
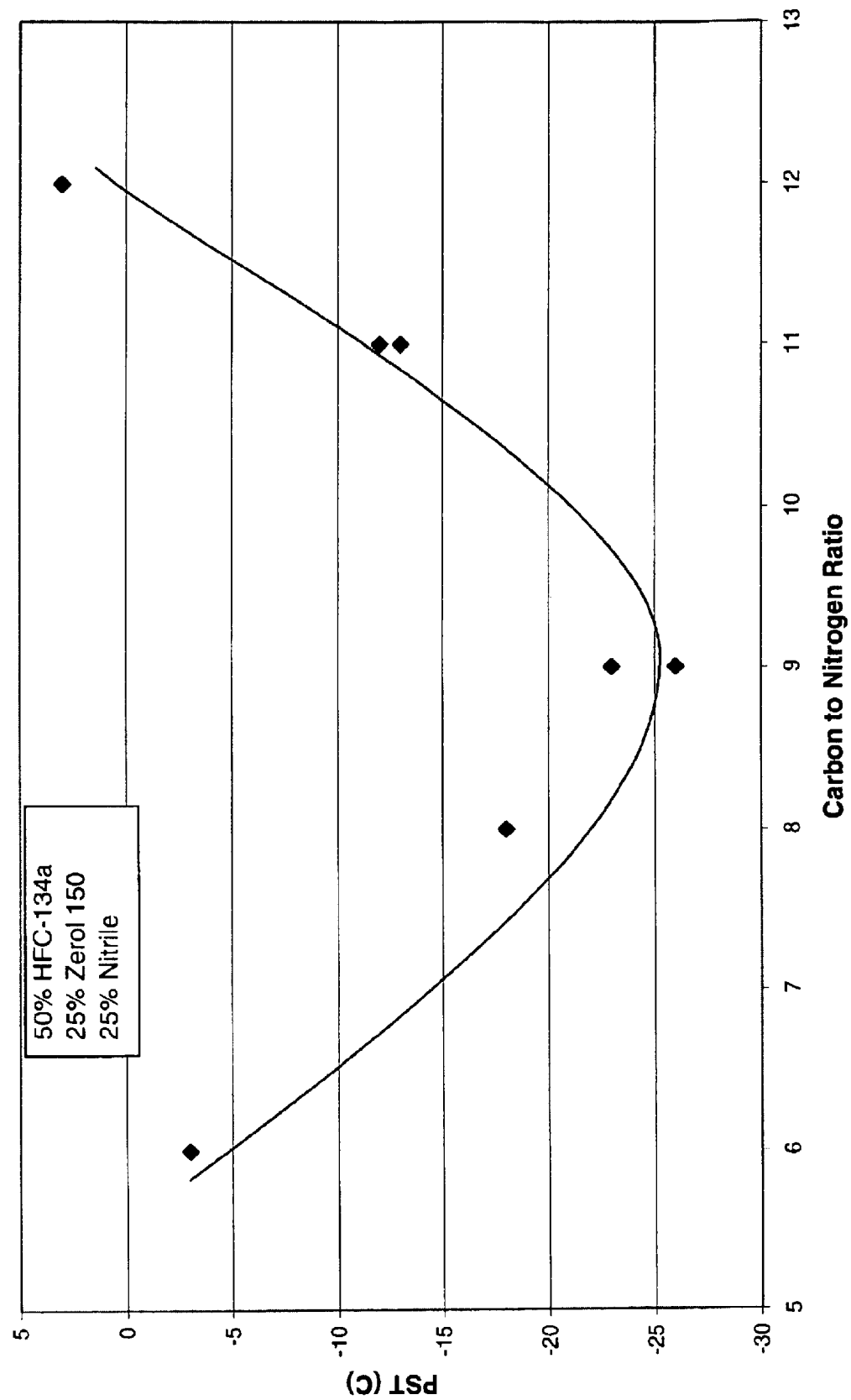
FIG. 4 is a graph of phase separation temperature (° C.) versus carbon to nitrogen ratio for various nitrile compatibilizers (25 wt %), HFC-134a refrigerant (50 wt %) and Zerol® 150 (25 wt %).

Nitrile compatibilizers of the present invention were placed in a suitable container with refrigerant and lubricant and the temperature lowered until two phases were observed. The composition in the container was 50 wt % HFC-134a, 25 wt % Zerol 150 and 25 wt % of a nitrile compound. Results are shown below, and in FIG. 4.

Example 4

| Compatibilizer | Formula | Phase Separation Temperature (° C.) | Carbon/Nitrogen Ratio |
|---|---|---|---|
| 1-cyanooctane | $C_9H_{17}N$ | −26 | 9 |
| 2-cyanooctane | $C_9H_{17}N$ | −23 | 9 |
| 1-cyanoheptane | $C_8H_{15}N$ | −18 | 8 |
| 1-cyanodecane | $C_{11}H_{21}N$ | −13 | 11 |
| 2-cyanodecane | $C_{11}H_{21}N$ | −12 | 11 |
| 1-cyanopentane | $C_6H_{11}N$ | −3 | 6 |
| 1-cyanoundecane | $C_{12}H_{23}N$ | 3 | 12 |

The data show significantly lower phase separation temperatures versus 50 wt % HFC-134a/50 wt % Zerol 150 alkylbenzene lubricant which has a phase separation temperature of 137° C. The data show that a minimum phase separation temperature occurs at a specific carbon to nitrogen ratio of the nitrile compatibilizer indicating solubility improvement of hydrofluorocarbon refrigerant in alkylbenzene lubricant.

Example 5

Figure 5:
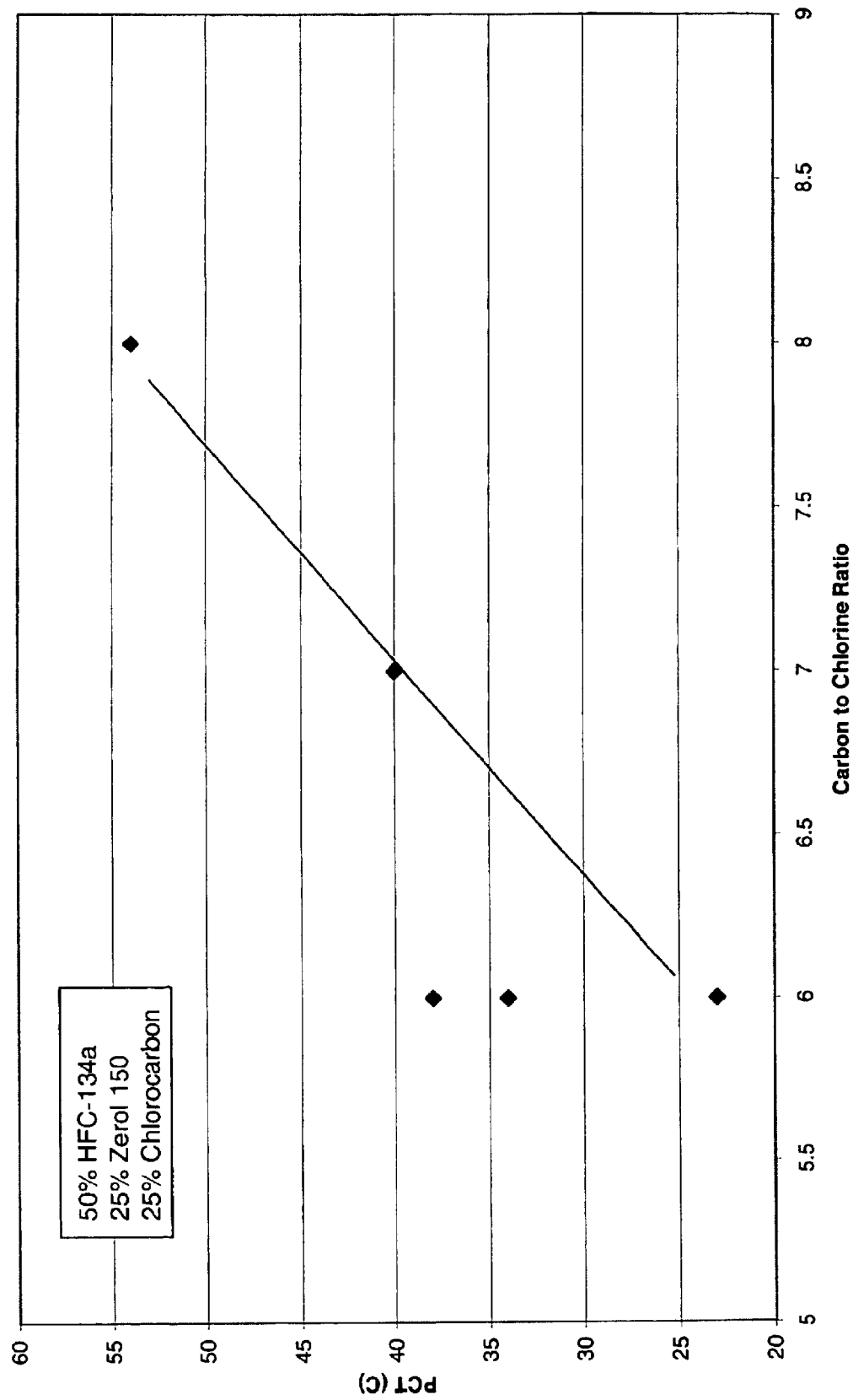
FIG. 5 is a graph of phase separation temperature (° C.) versus carbon to chlorine ratio for various chlorocarbon compatibilizers (25 wt %), HFC-134a refrigerant (50 wt %) and Zerol® 150 (25 wt %).

Chlorocarbon compatibilizers of the present invention were placed in a suitable container with refrigerant and lubricant and the temperature lowered until two phases were observed. The composition in the container was 50 wt % HFC-134a, 25 wt % Zerol 150 and 25 wt % of a chlorocarbon compatibilizer. Results are shown below, and in FIG. 5.

Example 5

| Compatibilizer | Formula | Phase Separation Temperature (° C.) | Carbon/Chlorine Ratio |
|---|---|---|---|
| 1-chlorobutane | $C_4H_9Cl$ | 16 | 4 |
| 3-(chloromethyl)pentane | $C_6H_{13}Cl$ | 34 | 6 |
| 1-chloroheptane | $C_7H_{15}Cl$ | 40 | 7 |
| 1,6-dichlorohexane | $C_6H_{12}Cl_2$ | 47 | 3 |
| 1-chlorooctane | $C_8H_{17}Cl$ | 54 | 8 |
| 1-chlorohexane | $C_6H_{13}Cl$ | 38 | 6 |
| 3-chloro-3-methylpentane | $C_6H_{13}Cl$ | 23 | 6 |

The data show significantly lower phase separation versus 50 wt % HFC-134a/50 wt % Zerol 150 alkylbenzene lubricant which has a phase separation temperature of 137° C. The data show that a minimum phase separation temperature occurs at a specific carbon to chlorine ratio of the chlorocarbon compatibilizer indicating maximum solubility improvement of hydrofluorocarbon refrigerant in alkylbenzene lubricant.

Example 6

Figure 6:
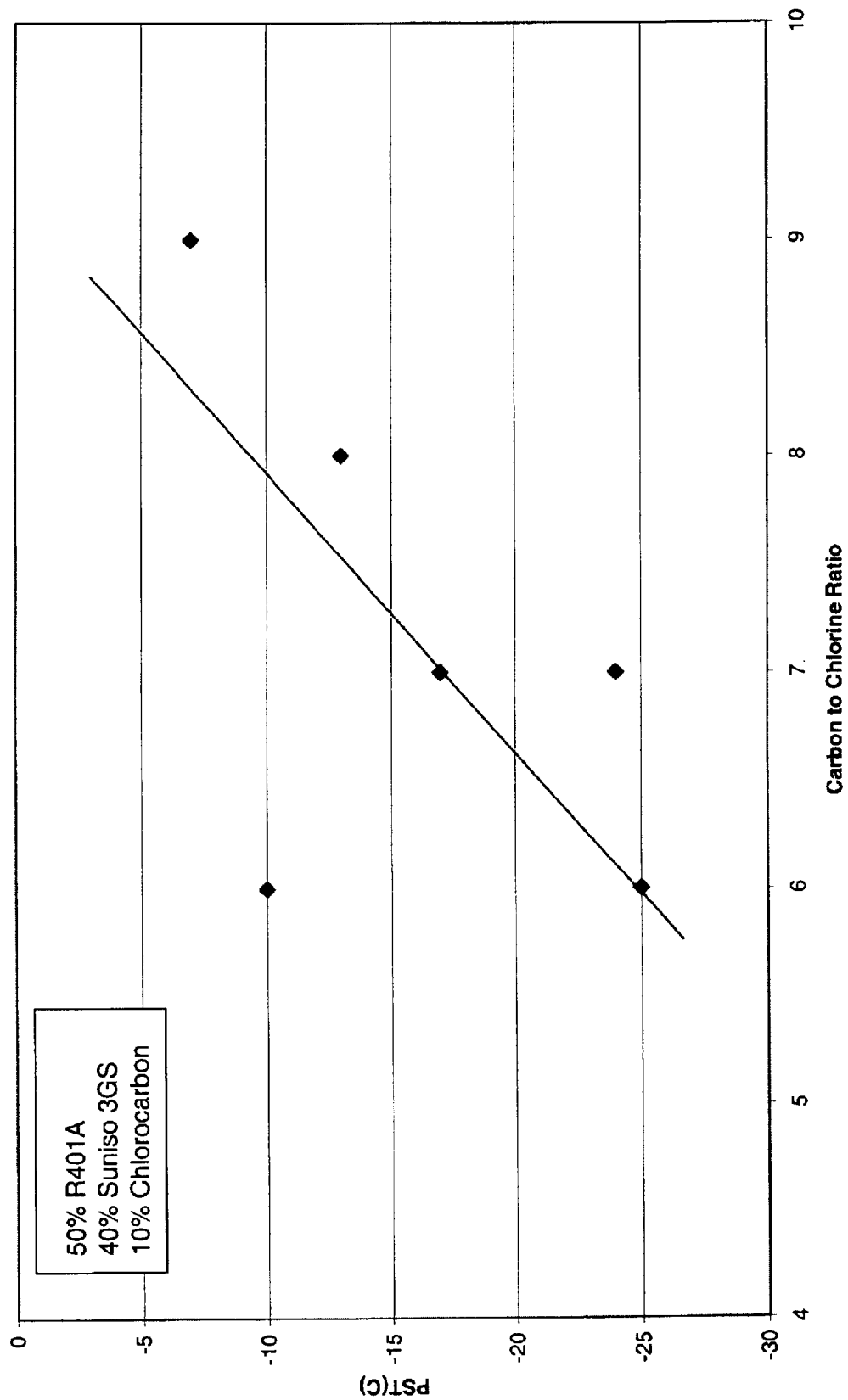
FIG. 6 is a graph of phase separation temperature (° C.) versus carbon to chlorine ratio for various chlorocarbon compatibilizers (10 wt %), R401A refrigerant (50 wt %) and Suniso® 3GS (40 wt %).

Chlorocarbon compatibilizers of the present invention were placed in a suitable container with refrigerant and lubricant and the temperature lowered until two phases were observed. The composition in the container was 50 wt % R401A refrigerant, 40 wt % Suniso 3GS and 10 wt % chlorocarbon compatibilizer. Results are shown below and in FIG. 6.

Example 6

| Compatibilizer | Formula | Phase Separation Temperature (° C.) | Carbon/Chlorine Ratio |
|---|---|---|---|
| 3-(chloromethyl)pentane | $C_6H_{13}Cl$ | −25 | 6 |
| 1-chloroheptane | $C_7H_{15}Cl$ | −24 | 7 |
| $C_6$ & $C_8$ monochlorides, 1:2 weight ratio | — | −17 | 6–8 |
| 1,6-dichlorohexane | $C_6H_{12}Cl_2$ | −14 | 3 |
| 1-chlorooctane | $C_8H_{17}Cl$ | −13 | 8 |
| 1-chlorohexane | $C_6H_{13}Cl$ | −10 | 6 |
| 3-chloro-3-methylpentane | $C_6H_{13}Cl$ | −10 | 6 |
| 1-chlorononane | $C_9H_{19}Cl$ | −7 | 9 |

The data show significantly lower phase separation versus 50 wt % R401A refrigerant/50 wt % Suniso 3GS mineral oil which has a phase separation temperature of 24° C. The data show that a minimum phase separation temperature occurs at a specific carbon to chlorine ratio of the chlorocarbon compatibilizer indicating maximum solubility of hydrochlorofluorocarbon-containing refrigerant in mineral oil lubricant.

Example 7

Figure 7:
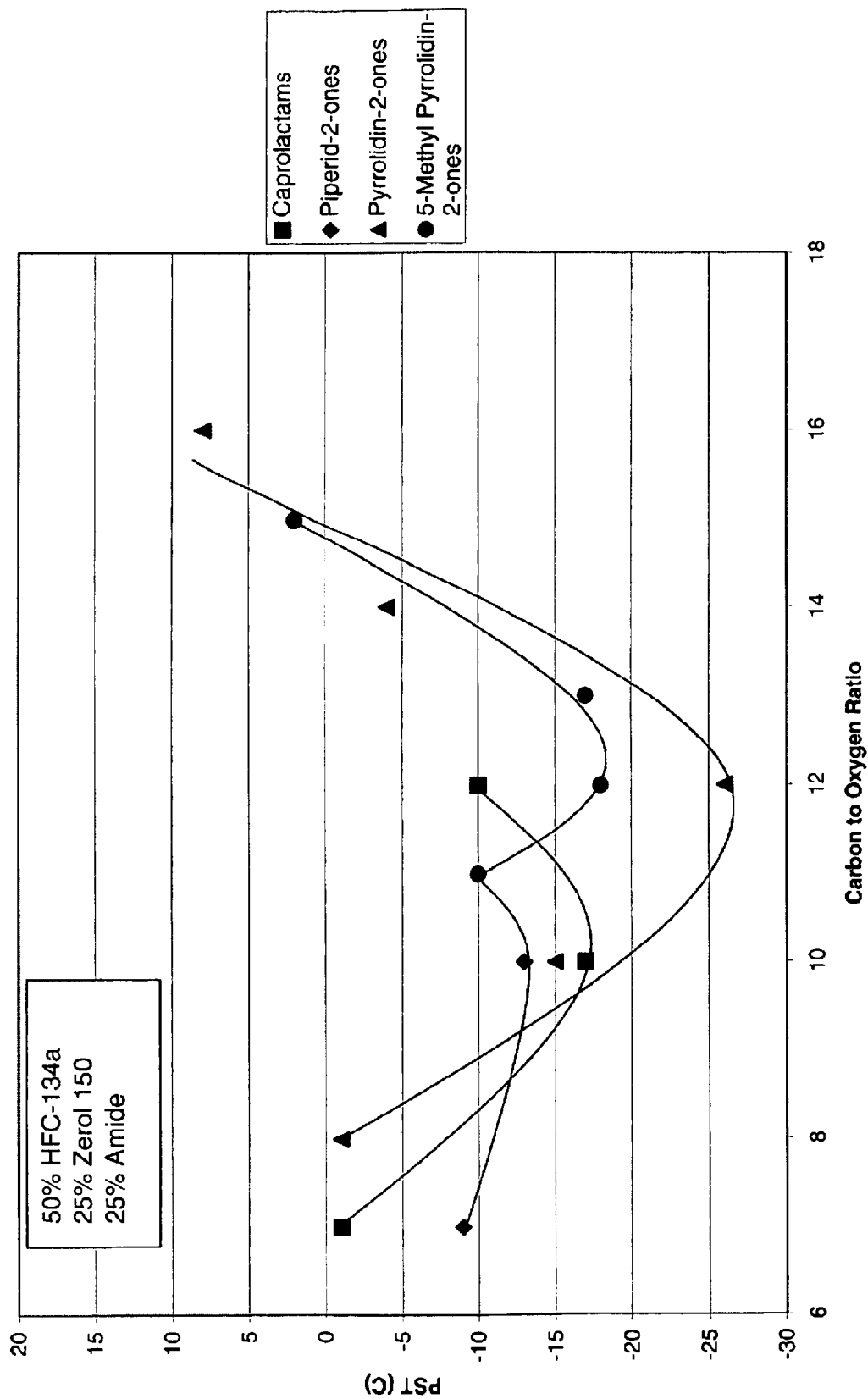
FIG. 7 is a graph of phase separation temperature (° C.) versus carbon to oxygen ratio for various amide compatibilizers (25 wt %), HFC-134a refrigerant (50 wt %) and Zero® 150 (25 wt %).
Figure 8:
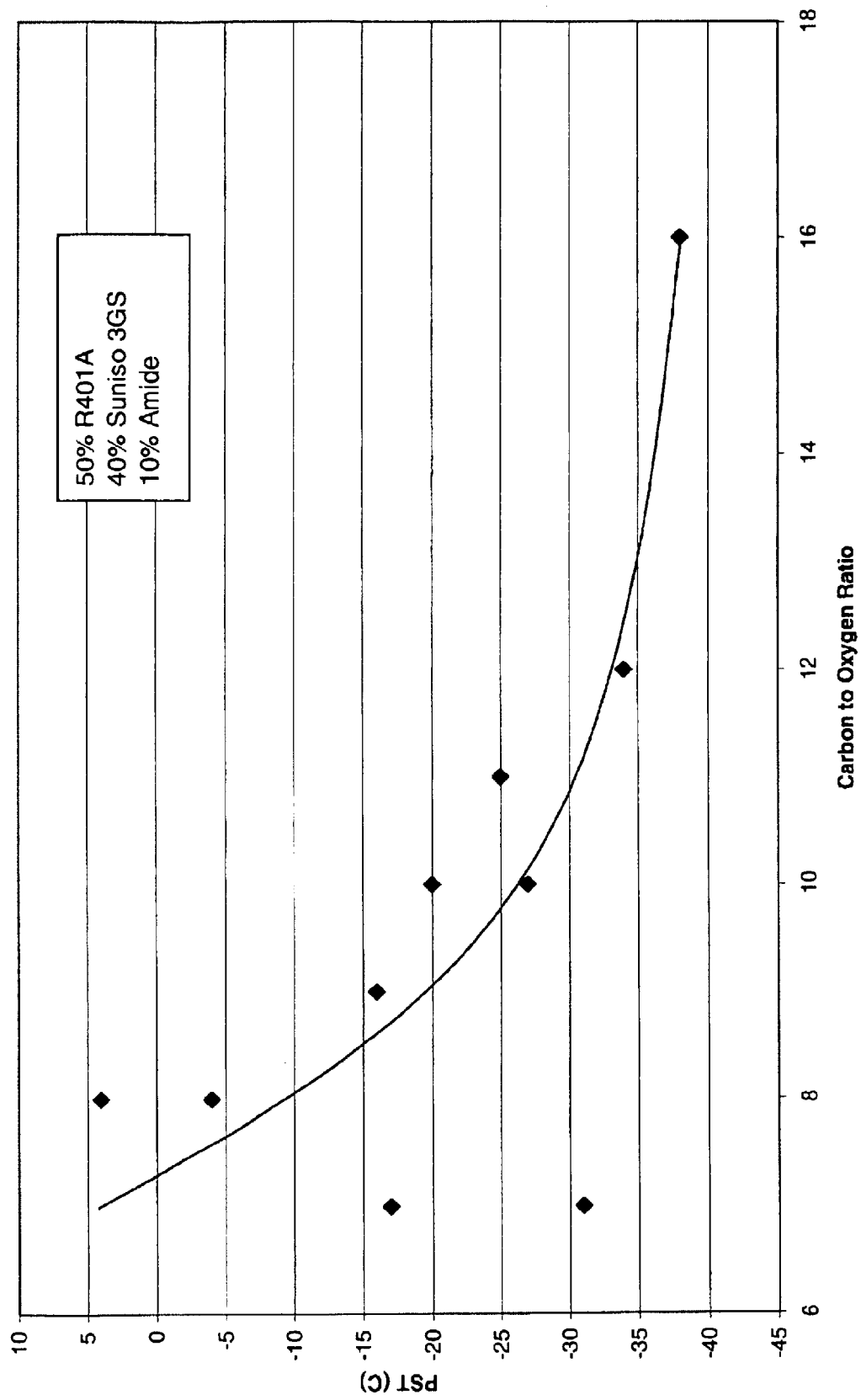
FIG. 8 is a graph of phase separation temperature (° C.) versus carbon to oxygen ratio for various amide compatibilizers (10 wt %), R401A refrigerant (50 wt %) and Suniso® 3GS (40 wt %).

Amide compatibilizers of the present invention were placed in a suitable container with refrigerant and lubricant and the temperature lowered until two phases were observed. The composition in the container was either HFC-134a or R401A refrigerants, Zerol 150 or Suniso 3GS lubricants, and an amide compatibilizer. Results are shown below and in FIGS. 7 and 8.

Example 7

| Compatibilizer | Formula | PST (° C.) 25% Zerol 150 25% Compatibilizer 50% HFC-134a | PST (° C.) 40% 3GS 10% Compatibilizer 50% R401A | Carbon to Oxygen Ratio |
|---|---|---|---|---|
| 1-octyl pyrrolidin-2-one | $C_{12}H_{23}NO$ | −25 | −34 | 12 |
| 1-heptyl-5-methylpyrrolidin-2-one | $C_{12}H_{23}NO$ | −18 | — | 12 |
| 1-octyl-5-methyl pyrrolidin-2-one | $C_{13}H_{25}NO$ | −17 | — | 13 |
| 1-butylcaprolactam | $C_{10}H_{19}NO$ | −17 | — | 10 |
| 1-cyclohexylpyrrolidin-2-one | $C_{10}H_{17}NO$ | −15 | −27 | 10 |
| 1-butyl-5-methylpiperidone | $C_{10}H_{19}NO$ | −13 | −20 | 10 |
| 1-pentyl-5-methyl piperidone | $C_{11}H_{21}NO$ | −10 | −25 | 11 |
| 1-hexyl caprolactam | $C_{12}H_{23}NO$ | −10 | — | 12 |
| 1-hexyl-5-methylpyrrolidin-2-one | $C_{11}H_{21}NO$ | −10 | — | 11 |
| 1,3-dimethyl piperidone | $C_7H_{13}NO$ | −9 | — | 7 |
| DMPD | $C_7H_{13}NO$ | −6 | — | 7 |
| 1-decyl-2-pyrrolidin-2-one | $C_{14}H_{27}NO$ | −4 | — | 14 |
| 1,1-dibutylformamide | $C_9H_{19}NO$ | −2 | −16 | 9 |
| 1-methyl caprolactam | $C_7H_{13}NO$ | −1 | −31 | 7 |
| 1-butyl pyrrolidin-2-one | $C_8H_{15}NO$ | −1 | −4 | 8 |
| 1-decyl-5-methylpyrrolidin-2-one | $C_{15}H_{29}NO$ | 2 | — | 15 |
| 1,5-dimethyl piperidone | $C_7H_{13}NO$ | 2 | −15 | 7 |
| 1-dodecyl pyrrolidin-2-one | $C_{16}H_{31}NO$ | 8 | −38 | 16 |
| 1,1-diisopropyl acetamide | $C_8H_{17}NO$ | 13 | 4 | 8 |

The data show significantly lower phase separation temperatures for both hydrofluorocarbon and hydrochlorofluorocarbon-containing refrigerant/lubricant systems versus 50 wt % HFC-134a/50 wt % Zerol 150 which has a phase separation temperature of 137° C., and 50 wt % R401A refrigerant/50 wt % Suniso 3GS which has a phase separation temperature of 24° C. The minimum phase separation temperature for amide compatibilizers with HFC-134a and Zerol 150 occurs at a specific carbon to amide oxygen ratio indicating a maximum solubility improvement for hydrofluorocarbon refrigerants and alkylbenzene lubricant. The phase separation temperature for amide compatibilizers with R401A refrigerant and Suniso 3GS mineral oil lubricant decreases with increasing carbon to amide oxygen ratio.

Example 8

Polyoxyalkylene glycol ether compatibilizers of the present invention were placed in a suitable container with refrigerant and lubricant and the temperature was lowered until two phases were observed. The composition in the container was 25 wt % Zerol 150, 25 wt % of compatibilizer and 50% of either HFC-32, HFC-125 or R410A refrigerants.

Figure 9:
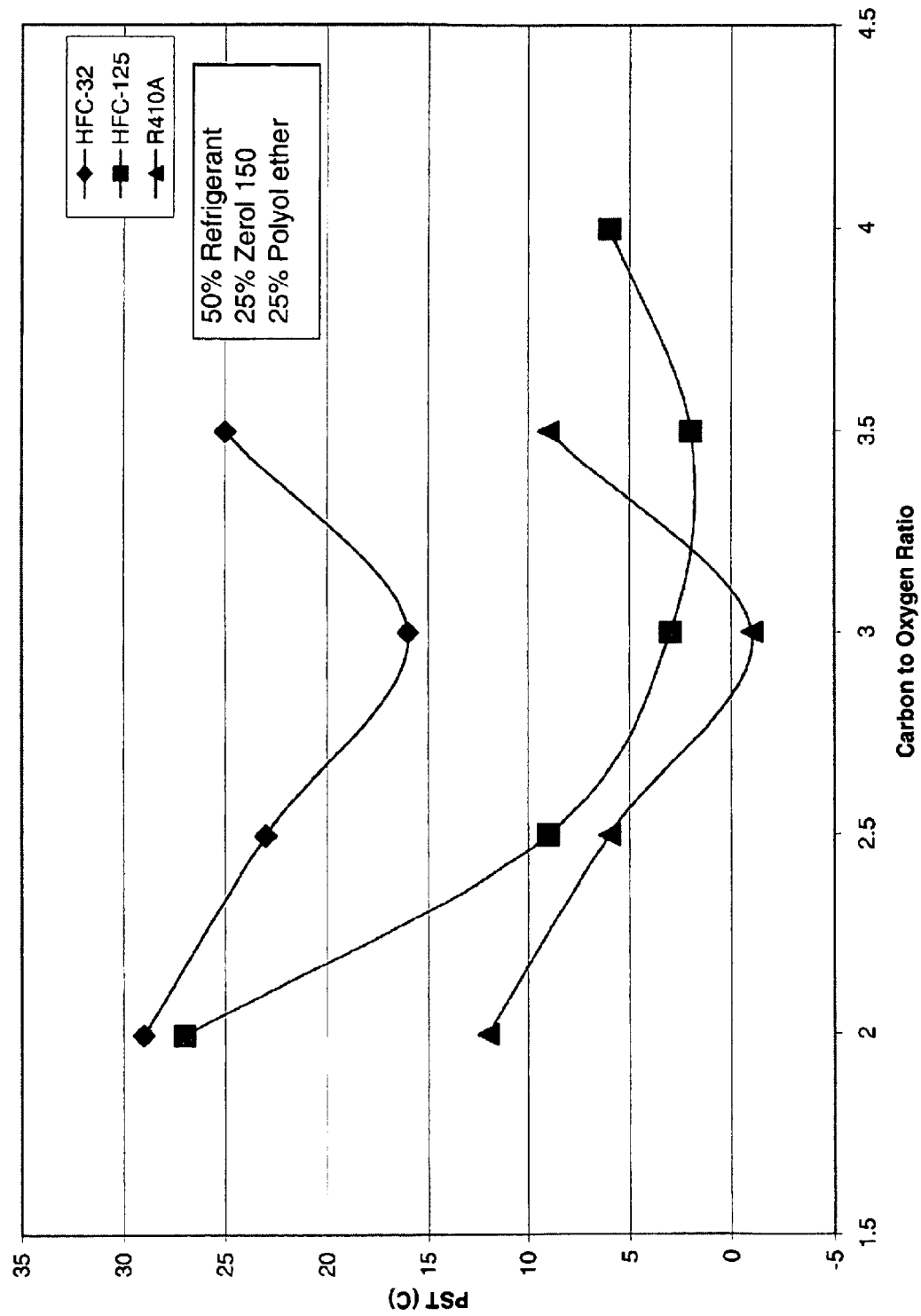
FIG. 9 shows graphs of phase separation temperature (° C.) versus carbon to oxygen ratio for various polyoxyalkylene glycol ether compatibilizers (25 wt %), Zerol® 150 (25 wt %) and refrigerant HFC-32, HFC-125 or R410A (50 wt %).

Results are shown below, and in FIG. 9.

Example 8

| Compatibilizer | Formula | PST with HFC-32 (° C.) | PST with HFC-125 (° C.) | PST with R410A (° C.) | Carbon/ Oxygen Ratio |
|---|---|---|---|---|---|
| Ethylene glycol dimethyl ether | $C_4H_{10}O_2$ | 29 | 27 | 12 | 2.0 |
| Propylene glycol dimethyl ether | $C_5H_{12}O_2$ | 23 | 7 | 6 | 2.5 |
| Ethylene glycol diethyl ether | $C_6H_{14}O_2$ | 16 | 3 | −1 | 3.0 |
| Propylene glycol butyl ether | $C_7H_{16}O_2$ | 25 | 2 | 9 | 3.5 |
| Butylene glycol n-butyl ether | $C_8H_{18}O_2$ | — | 6 | — | 4 |

The data show an unexpected and generally lower phase separation temperature when HFC-32 and HFC-125 refrigerants are combined to form R410A refrigerant versus neat HFC-32 or HFC-125.

Example 9

Aryl ether, 1,1,1-trifluoroalkane and fluoroether compatibilizers of the present invention were placed in a suitable container with refrigerant and lubricant and the temperature lowered until two phases were observed. The composition in the container was 50 wt % HFC-134a refrigerant, 25 wt % Zerol 150 alkylbenzene lubricant and 25 wt % of compatibilizer. Results are shown below.

Example 9

| Compatibilizer | Formula | PST (° C.) 25% Zerol 150 25% Compatibilizer 50% HFC-134a | PST (° C.) 40% 3GS 10% Compatibilizer 50% R401A |
|---|---|---|---|
| methoxybenzene | $C_7H_8O$ | 13 | — |
| 1,3-dimethoxybenzene | $C_8H_{10}O_2$ | 15 | — |
| ethoxybenzene | $C_8H_{10}O$ | 20 | — |
| 1,1,1-trifluorododecane | $C_{12}H_{23}F_3$ | 27 | −28 |
| 1,1,1-trifluorohexane | $C_6H_{11}F_3$ | 32 | — |
| $C_8H_{17}OCF_2CF_2H$ | $C_{10}H_{18}F_4O$ | 21 | −12 |
| $C_6H_{13}OCF_2CF_2H$ | $C_8H_{14}F_4O$ | 27 | −11 |

The data show significantly lower phase separation temperatures for these compatibilizers with both hydrofluorocarbon and hydrochlorofluorocarbon-containing refrigerants versus 50 wt % HFC-134a/50 wt % Zerol 150, which has a phase separation temperature of 137° C., and 50 wt % R401A refrigerant/50 wt % Suniso 3GS, which has a phase separation temperature of 24° C.

Examples 10–28

A test tube was filled with 7.5 grams of HFC-43-10 mee ($CF_2CF_2CHFCHFCF_3$), herein referred to as "4310", and 2.5 grams of selected lubricant. Compatibilizers of the present invention were added in 1 gram increments to the 4310/lubricant mixture and the contents of the tube were agitated at 25° C. Changes in phase levels were recorded and compositions of layers analyzed by gas chromatography. One gram increments of compatibilizer were added until the contents of the tube reached one homogeneous phase. Results are shown below.

Example 10

| Grams of DPM added to Tube | Total Composition in Tube | Top Layer Height, mm | Bottom Layer Height, mm | Top Layer wt % | Bottom Layer wt % |
|---|---|---|---|---|---|
| 0 | 75.0% 4310 25.0% Zerol 150 | 20 | 35 | — | — |
| 1 | 9.1% DPM 68.2% 4310 22.7% Zerol 150 | 21 | 41 | 5% DPM 7% 4310 88% Zerol 150 | 11% DPM 85% 4310 4% Zerol 150 |
| 2 | 16.7% DPM 62.5% 4310 20.8% Zerol 150 | 20 | 49 | 9% DPM 9% 4310 82% Zerol 150 | 21% DPM 73% 4310 6% Zerol 150 |
| 3 | 23.1% DPM 57.7% 4310 19.2% Zerol 150 | 18 | 59 | 10% DPM 7% 4310 83% Zerol 150 | 29% DPM 63% 4310 8% Zerol 150 |
| 4 | 28.6% DPM 53.6% 4310 17.8% Zerol 150 | 14 | 71 | 18% DPM 11% 4310 71% Zerol 150 | 35% DPM 53% 4310 12% Zerol 150 |
| 5 | 33.3% DPM 50.0% 4310 16.7% Zerol 150 | 5 | 87 | 24% DPM 14% 4310 62% Zerol 150 | 37% DPM 45% 4310 18% Zerol 150 |

-continued

| Grams of DPM added to Tube | Total Composition in Tube | Top Layer Height, mm | Bottom Layer Height, mm | Top Layer wt % | Bottom Layer wt % |
|---|---|---|---|---|---|
| 6 | 37.5% DPM 46.9% 4310 15.6% Zerol 150 | — | — | one layer | one layer |

Example 11

| Grams of PnB added to Tube | Total Composition in Tube | Top Layer Height, mm | Bottom Layer Height, mm | Top Layer wt % | Bottom Layer Wt % |
|---|---|---|---|---|---|
| 0 | 75.0% 4310 25.0% Zerol 150 | 21 | 34 | — | — |
| 1 | 9.1% D PnB 68.2% 4310 22.7% Zerol 150 | 23 | 40 | 19% PnB 15% 4310 66% Zerol 150 | 8% PnB 89% 4310 3% Zerol 150 |
| 2 | 16.7% PnB 62.5% 4310 20.8% Zerol 150 | 25 | 47 | 31% PnB 25% 4310 44% Zerol 150 | 17% PnB 79% 4310 4% Zerol 150 |
| 3 | 23.1% PnB 57.7% 4310 19.2% Zerol 150 | 23 | 57 | 35% PnB 35% 4310 30% Zerol 150 | 25% PnB 69% 4310 6% Zerol 150 |
| 4 | 28.6% PnB 53.6% 4310 17.8% Zerol 150 | — | — | one layer | one layer |

Example 12

| Grams of DPnB added to Tube | Total Composition in Tube | Top Layer Height, mm | Bottom Layer Height, mm | Top Layer wt % | Bottom Layer Wt % |
|---|---|---|---|---|---|
| 0 | 75.0% 4310 25.0% Zerol 150 | 21 | 34 | — | — |
| 1 | 9.1% DPnB 68.2% 4310 22.7% Zerol 150 | 23 | 40 | 14% DPnB 13% 4310 72% Zerol 150 | 7% DPnB 88% 4310 5% Zerol 150 |
| 2 | 16.7% DPnB 62.5% 4310 20.8% Zerol 150 | 26 | 45 | 25% DPnB 18% 4310 57% Zerol 150 | 15% DPnB 79% 4310 6% Zerol 150 |
| 3 | 23.1% DPnB 57.7% 4310 19.2% Zerol 150 | 27 | 51 | 35% DPnB 29% 4310 36% Zerol 150 | 24% DPnB 68% 4310 8% Zerol150 |
| 4 | 28.6% DPnB 53.6% 4310 17.8% Zerol 150 | — | — | one layer | one layer |

Example 13

| Grams of TPnB added to Tube | Total Composition in Tube | Top Layer Height, mm | Bottom Layer Height, mm | Top Layer wt % | Bottom Layer Wt % |
|---|---|---|---|---|---|
| 0 | 75.0% 4310 25.0% Zerol 150 | 21 | 34 | — | — |
| 1 | 9.1% TPnB 68.2% 4310 22.7% Zerol 150 | 24 | 40 | 29% TPnB 23% 4310 48% Zerol 150 | 6% TPnB 93% 4310 1% Zerol 150 |

-continued

| Grams of TPnB added to Tube | Total Composition in Tube | Top Layer Height, mm | Bottom Layer Height, mm | Top Layer wt % | Bottom Layer Wt % |
|---|---|---|---|---|---|
| 2 | 16.7% TPnB<br>62.5% 4310<br>20.8% Zerol 150 | 27 | 44 | 33% TPnB<br>25% 4310<br>42% Zerol 150 | 14% TPnB<br>84% 4310<br>2% Zerol 150 |
| 3 | 23.1% TPnB<br>57.7% 4310<br>19.2% Zerol 150 | 30 | 48 | 32% TPnB<br>33% 4310<br>35% Zerol 150 | 19% TPnB<br>77% 4310<br>4% Zerol150 |
| 4 | 28.6% TPnB<br>53.6% 4310<br>17.8% Zerol 150 | — | — | one layer | one layer |

Example 14

| Grams of PnP added to Tube | Total Composition in Tube | Top Layer Height, mm | Bottom Layer Height, mm | Top Layer wt % | Bottom Layer Wt % |
|---|---|---|---|---|---|
| 0 | 75.0% 4310<br>25.0% Zerol 150 | 21 | 34 | — | — |
| 1 | 9.1% PnP<br>68.2% 4310<br>22.7% Zerol 150 | 21 | 41 | 17% PnP<br>15% 4310<br>68% Zerol 150 | 9% PnP<br>89% 4310<br>2% Zerol 150 |
| 2 | 16.7% PnP<br>62.5% 4310<br>20.8% Zerol 150 | 23 | 48 | 27% PnP<br>22% 4310<br>51% Zerol 150 | 18% PnP<br>74% 4310<br>8% Zerol 150 |
| 3 | 23.1% PnP<br>57.7% 4310<br>19.2% Zerol 150 | 20 | 59 | 29% PnP<br>25% 4310<br>46% Zerol 150 | 26% PnP<br>68% 4310<br>6% Zerol 150 |
| 4 | 28.6% PnP<br>53.6% 4310<br>17.8% Zerol 150 | — | — | one layer | one layer |

Example 15

| Grams of DPnP added to Tube | Total Composition in Tube | Top Layer Height, mm | Bottom Layer Height, mm | Top Layer wt % | Bottom Layer Wt % |
|---|---|---|---|---|---|
| 0 | 75.0% 4310<br>25.0% Zerol 150 | 21 | 34 | — | — |
| 1 | 9.1% DPnP<br>68.2% 4310<br>22.7% Zerol 150 | 22 | 41 | 8% DPnP<br>7% 4310<br>85% Zerol 150 | 8% DPnP<br>87% 4310<br>5% Zerol 150 |
| 2 | 16.7% DPnP<br>62.5% 4310<br>20.8% Zerol 150 | 23 | 47 | 16% DPnP<br>12% 4310<br>72% Zerol 150 | 17% DPnP<br>76% 4310<br>7% Zerol 150 |
| 3 | 23.1% DPnP<br>57.7% 4310<br>19.2% Zerol150 | 22 | 56 | 27% DPnP<br>19% 4310<br>54% Zerol 150 | 24% DPnP<br>67% 4310<br>9% Zerol150 |
| 4 | 28.6% DPnP<br>53.6% 4310<br>17.8% Zerol 150 | — | — | one layer | one layer |

Example 16

| Grams of DMM added to Tube | Total Composition in Tube | Top Layer Height, mm | Bottom Layer Height, mm | Top Layer wt % | Bottom Layer Wt % |
|---|---|---|---|---|---|
| 0 | 75.0% 4310<br>25.0% Zerol 150 | 21 | 34 | — | — |

-continued

| Grams of DMM added to Tube | Total Composition in Tube | Top Layer Height, mm | Bottom Layer Height, mm | Top Layer wt % | Bottom Layer Wt % |
|---|---|---|---|---|---|
| 1 | 9.1% DMM<br>68.2% 4310<br>22.7% Zerol 150 | 22 | 40 | 8% DMM<br>11% 4310<br>81% Zerol 150 | 9% DMM<br>90% 4310<br>1% Zerol 150 |
| 2 | 16.7% DMM<br>62.5% 4310<br>20.8% Zerol 150 | 23 | 47 | 16% DMM<br>14% 4310<br>70% Zerol 150 | 16% DMM<br>82% 4310<br>2% Zerol 150 |
| 3 | 23.1% DMM<br>57.7% 4310<br>19.2% Zerol 150 | 22 | 55 | 24% DMM<br>21% 4310<br>55% Zerol 150 | 21% DMM<br>72% 4310<br>7% Zerol 150 |
| 4 | 28.6% DMM<br>53.6% 4310<br>17.8% Zerol 150 | 4 | 81 | 33% DMM<br>37% 4310<br>30% Zerol 150 | 29% DMM<br>55% 4310<br>16% Zerol 150 |
| 5 | 33.3% DMM<br>50.0% 4310<br>16.7% Zerol 150 | — | — | one layer | one layer |

Example 17

In this example, DIP=equal parts by weight of PnB, DPnB and Isopar H.

| Grams of DIP added to Tube | Total Composition in Tube | Top Layer Height, mm | Bottom Layer Height, mm | Top Layer wt % | Bottom Layer Wt % |
|---|---|---|---|---|---|
| 0 | 75.0% 4310<br>25.0% Zerol 150 | 21 | 34 | — | — |
| 1 | 3.0% PnB<br>3.0% Isopar(R)H<br>3.0% DPnB<br>68.2% 4310<br>22.7% Zerol 150 | 26 | 37 | 6% PnB<br>16% Isopar(R)H<br>6% DPnB<br>17% 4310<br>55% Zerol 150 | 3% PnB<br>1% Isopar(R)H<br>3% DPnB<br>91% 4310<br>2% Zerol 150 |
| 2 | 5.6% PnB<br>5.6% Isopar(R)H<br>5.6% DPnB<br>62.5% 4310<br>20.8% Zerol 150 | 30 | 41 | 11% PnB<br>24% Isopar(R)H<br>11% DPnB<br>29% 4310<br>25% Zerol 150 | 5% PnB<br>2% Isopar(R)H<br>5% DPnB<br>86% 4310<br>2% Zerol 150 |
| 3 | 7.7% PnB<br>7.7% Isopar(R)H<br>7.7% DPnB<br>57.7% 4310<br>19.2% Zerol 150 | 36 | 43 | 11% PnB<br>19% Isopar(R)H<br>11% DPnB<br>29% 4310<br>30% Zerol 150 | 7% PnB<br>4% Isopar(R)H<br>8% DPnB<br>77% 4310<br>4% Zerol 150 |
| 4 | 9.5% PnB<br>9.5% Isopar(R)H<br>9.5% DPnB<br>53.6% 4310<br>17.8% Zerol 150 | 44 | 44 | 10% PnB<br>14% Isopar(R)H<br>11% DPnB<br>30% 4310<br>35% Zerol 150 | 9% PnB<br>7% Isopar(R)H<br>10% DPnB<br>64% 4310<br>10% Zerol 150 |
| 5 | 11.1% PnB<br>11.1% Isopar(R)H<br>11.1% DPnB<br>50.0% 4310<br>16.7% Zerol 150 | — | — | one layer | one layer |

Example 18

In this example, 2-heptanone is referred to as "A".

| Grams of A added to Tube | Total Composition in in Tube | Top Layer Height, mm | Bottom Layer Height, mm | Top Layer wt % | Bottom Layer Wt % |
|---|---|---|---|---|---|
| 0 | 75.0% 4310<br>25.0% 3GS | 19 | 34 | | |
| 1 | 9.1% A<br>68.2% 4310<br>22.7% 3GS | 20 | 42 | 3.2% A<br>3.2% 4310<br>92.9% 3GS | 9.8% A<br>86.4% 4310<br>3.8% 3GS |
| 2 | 16.7% A<br>62.5% 4310<br>20.8% 3GS | 19 | 52 | 7.6% A<br>6.7% 4310<br>85.7% 3GS | 16.9% A<br>77.7% 4310<br>5.4% 3GS |
| 3 | 23.1% A<br>57.7% 4310<br>19.2% 3GS | 15 | 64 | 10.8% A<br>10.6% 4310<br>78.6% 3GS | 23.2% A<br>63.7% 4310<br>13.1% 3GS |
| 4 | 28.6% A<br>53.6% 4310<br>17.8% 3GS | | | one layer | one layer |

Example 19

In this example, 5-methyl-2-hexanone is referred to as "A".

| Grams of A added to Tube | Total Composition in Tube | Heights of both layer | Composition - top layer | Composition - bottom layer |
|---|---|---|---|---|
| 0 | 75% 4310<br>25% 3GS | Top - 19 mm<br>Bottom - 34 mm | — | — |
| 1 | 9.1% A<br>68.2% 4310<br>22.7% 3GS | Top - 21 mm, clear<br>Bottom - 42 mm, clear | 3.0% A<br>3.4% 4310<br>93.6% 3GS | 10.3% A<br>87.9% 4310<br>1.8% 3GS |
| 2 | 16.7% A<br>62.5% 4310<br>20.8% 3GS | Top - 19 mm, clear<br>Bottom - 51 mm, clear | 8.9% A<br>6.9% 4310<br>84.2% 3GS | 18.2% A<br>78.6% 4310<br>3.2% 3GS |
| 3 | 23.1% A<br>57.7% 4310<br>19.2% 3GS | Top - 16 mm, clear<br>Bottom - 62 mm, clear | 10.8% A<br>7.9% 4310<br>81.3% 3GS | 23.7% A<br>62.9% 4310<br>13.4% 3GS |
| 4 | 28.6% A<br>53.6% 4310<br>17.8% 3GS | Top - 10 mm, clear<br>Bottom - 78 mm, clear | 13.6% A<br>9.9% 4310<br>76.5% 3GS | 25.8% A<br>59.2% 4310<br>15.0% 3GS |
| 4.5 | 31.0% A<br>51.7% 4310<br>17.3% 3GS | Top - 3 mm, clear<br>Bottom - 90 mm, clear | 27.0% A<br>14.1% 4310<br>58.9% 3GS | 29.8% A<br>50.0% 4310<br>20.2% 3GS |
| 5 | 33.3% A<br>50.0% 4310<br>16.7% 3GS | Clear one layer - 97 mm | — | — |

Example 20

| Grams of Isopar H added to Tube | Total Composition in Tube | Top Layer Height, mm | Bottom Layer Height, mm | Top Layer wt % | Bottom Layer Wt % |
|---|---|---|---|---|---|
| 0 | 75.0% 4310<br>25.0% 3GS | 19 | 34 | — | — |
| 1 | 9.1% Isopar(R)H<br>68.2% 4310<br>22.7% 3GS | 29 | 34 | 31.4% Isopar(R)H<br>0.4% 4310<br>68.2% 3GS | 5.4% Isopar(R)H<br>93.9% 4310<br>0.7% 3GS |
| 2 | 16.7% Isopar(R)H<br>62.5% 4310<br>20.8% 3GS | 37 | 34 | 45.7% Isopar(R)H<br>1.0% 4310<br>53.3% 3GS | 8.2% Isopar(R)H<br>90.7% 4310<br>1.0% 3GS |
| 3 | 23.1% Isopar(R)H<br>57.7% 4310<br>19.2% 3GS | 46 | 34 | 56.8% Isopar(R)H<br>1.9% 4310<br>41.3% 3GS | 9.5% Isopar(R)H<br>89.6% 4310<br>0.9% 3GS |
| 4 | 28.6% Isopar(R)H<br>53.6% 4310<br>17.8% 3GS | 57 | 33 | 62.9% Isopar(R)H<br>2.9% 4310<br>34.2% 3GS | 10.5% Isopar(R)H<br>88.6% 4310<br>0.9% 3GS |
| 5 | 33.3% Isopar(R)H<br>50.0% 4310<br>16.7% 3GS | 66 | 33 | 69.0% Isopar(R)H<br>3.3% 4310<br>27.7% 3GS | 11.6% Isopar(R)H<br>87.7% 4310<br>0.7% 3GS |
| 10 | Never Reached one phase | — | — | — | — |

Example 21

In this example, PDD=equal parts by weight of PnB, DMM and DPnB.

| Grams of PDD added to Tube | Total Composition in Tube | Top Layer Height, mm | Bottom Layer Height, mm | Top Layer wt % | Bottom Layer Wt % |
|---|---|---|---|---|---|
| 0 | 75.0% 4310<br>25.0% Zerol 150 | 21 | 34 | — | — |
| 1 | 3.0% PnB<br>3.0% DMM<br>3.0% DPnB<br>68.2% 4310<br>22.7% Zerol 150 | 23 | 39 | 5% PnB<br>4% DMM<br>5% DPnB<br>14% 4310<br>72% Zerol 150 | 3% PnB<br>3% DMM<br>3% DPnB<br>87% 4310<br>4% Zerol 150 |
| 2 | 5.6% PnB<br>5.6% DMM<br>5.6% DPnB<br>62.5% 4310<br>20.8% Zerol 150 | 24 | 46 | 6% PnB<br>5% DMM<br>6% DPnB<br>15% 4310<br>68% Zerol 150 | 6% PnB<br>6% DMM<br>6% DPnB<br>76% 4310<br>6% Zerol 150 |
| 3 | 7.7% PnB<br>7.7% DMM<br>7.7% DPnB<br>57.7% 4310<br>19.2% Zerol 150 | 23 | 55 | 11% PnB<br>10% DMM<br>11% DPnB<br>24% 4310<br>44% Zerol 150 | 8% PnB<br>9% DMM<br>8% DPnB<br>63% 4310<br>12% Zerol 150 |
| 4 | 11.1% PnB<br>11.1% DMM<br>11.1% DPnB<br>50.0% 4310<br>16.7% Zerol 150 | — | — | one layer | one layer |

Example 22

In this example, DDN=equal parts by weight of DPnB, DMM and Naptha 140 ("N140").

| Grams of DDN added to Tube | Total Composition in Tube | Top Layer Height, mm | Bottom Layer Height, mm | Top Layer wt % | Bottom Layer Wt % |
|---|---|---|---|---|---|
| 0 | 75.0% 4310<br>25.0% Zerol 150 | 21 | 34 | — | — |
| 1 | 3.0% DPnB<br>3.0% DMM<br>3.0% N140<br>68.2% 4310<br>22.7% Zerol 150 | 25 | 38 | 3% DPnB<br>3% DMM<br>9% N140<br>8% 4310<br>77% Zerol 150 | 3% DPnB<br>3% DMM<br><1% N140<br>93% 4310<br>1% Zerol 150 |
| 2 | 5.6% DPnB<br>5.6% DMM<br>5.6% N140<br>62.5% 4310<br>20.8% Zerol 150 | 29 | 42 | 7% DPnB<br>6% DMM<br>16% N140<br>12% 4310<br>59% Zerol 150 | 5% DPnB<br>5% DMM<br>1% N140<br>87% 4310<br>2% Zerol 150 |
| 3 | 7.7% DPnB<br>7.7% DMM<br>7.7% N140<br>57.7% 4310<br>19.2% Zerol 150 | 34 | 45 | 9% DPnB<br>8% DMM<br>19% N140<br>17% 4310<br>47% Zerol 150 | 7% DPnB<br>8% DMM<br>3% N140<br>80% 4310<br>2% Zerol 150 |
| 4 | 9.5% DPnB<br>9.5% DMM<br>9.5% N140<br>53.6% 4310<br>17.8% Zerol 150 | 39 | 48 | 10% DPnB<br>9% DMM<br>18% N140<br>23% 4310<br>40% Zerol 150 | 9% DPnB<br>10% DMM<br>5% N140<br>70% 4310<br>6% Zerol 150 |
| 5 | 11.1% DPnB<br>11.1% DMM<br>11.1% N140<br>50.0% 4310<br>16.7% Zerol 150 | 43 | 52 | 11% DPnB<br>11% DMM<br>15% N140<br>39% 4310<br>24% Zerol 150 | 11% DPnB<br>11% DMM<br>9% N140<br>58% 4310<br>11% Zerol 150 |
| 6 | 12.5% DPnB<br>12.5% DMM<br>12.5% N140<br>46.9% 4310<br>15.6% Zerol 150 | — | — | One Layer | One Layer |

Example 23

In this example, DDA=equal parts by weight of DPnB, DMM and Aromatic 150 ("A150").

| Grams of DDA added to Tube | Total Composition in Tube | Top Layer Height, mm | Bottom Layer Height, mm | Top Layer wt % | Bottom Layer Wt % |
|---|---|---|---|---|---|
| 0 | 75.0% 4310<br>25.0% Zerol 150 | 21 | 34 | — | |
| 1 | 3.0% DPnB<br>3.0% DMM<br>3.0% A150<br>68.2% 4310<br>22.7% Zerol 150 | 24 | 38 | 5% DPnB<br>4% DMM<br>13% A150<br>18% 4310<br>60% Zerol 150 | 2% DPnB<br>2% DMM<br>1% A150<br>93% 4310<br>2% Zerol 150 |
| 2 | 5.6% DPnB<br>5.6% DMM<br>5.6% A150<br>62.5% 4310<br>20.8% Zerol 150 | 28 | 42 | 6% DPnB<br>5% DMM<br>12% A150<br>17% 4310<br>60% Zerol 150 | 5% DPnB<br>5% DMM<br>2% A150<br>86% 4310<br>2% Zerol 150 |
| 3 | 7.7% DPnB<br>7.7% DMM<br>7.7% A150<br>57.7% 4310<br>19.2% Zerol 150 | 32 | 46 | 11% DPnB<br>10% DMM<br>20% A150<br>36% 4310<br>23% Zerol 150 | 7% DPnB<br>8% DMM<br>4% A150<br>77% 4310<br>4% Zerol 150 |
| 4 | 9.5% DPnB<br>9.5% DMM<br>9.5% A150<br>53.6% 4310<br>17.8% Zerol 150 | 35 | 51 | 12% DPnB<br>12% DMM<br>18% A150<br>40% 4310<br>18% Zerol 150 | 9% DPnB<br>9% DMM<br>7% A150<br>68% 4310<br>7% Zerol 150 |

-continued

| Grams of DDA added to Tube | Total Composition in Tube | Top Layer Height, mm | Bottom Layer Height, mm | Top Layer wt % | Bottom Layer Wt % |
|---|---|---|---|---|---|
| 5 | 11.1% DPnB<br>11.1% DMM<br>11.1% A150<br>50.0% 4310<br>16.7% Zerol 150 | — | — | One Layer | One Layer |

Example 24

In this example, PD=2 parts by wt PnB, 1 part DPnB.

| Grams of PD added to Tube | Total Composition in Tube | Top Layer Height, mm | Bottom Layer Height, mm | Top Layer wt % | Bottom Layer Wt % |
|---|---|---|---|---|---|
| 0 | 75.0% 4310<br>25.0% Zerol 150 | 21 | 34 | — | — |
| 1 | 9.1% PD<br>68.2% 4310<br>22.7% Zerol 150 | 23 | 39 | 8% PnB<br>4% DPnB<br>12% 4310<br>76% Zerol 150 | 5% PnB<br>2% DPnB<br>91% 4310<br>2% Zerol 150 |
| 2 | 16.7% PD<br>62.5% 4310<br>20.8% Zerol 150 | 25 | 44 | 14% PnB<br>7% DPnB<br>20% 4310<br>59% Zerol 150 | 10% PnB<br>5% DPnB<br>82% 4310<br>3% Zerol 150 |
| 3 | 23.1% PD<br>57.7% 4310<br>19.2% Zerol 150 | 26 | 52 | 24% PnB<br>11% DPnB<br>43% 4310<br>22% Zerol 150 | 15% PnB<br>7% DPnB<br>70% 4310<br>8% Zerol 150 |
| 4 | 28.6% PD<br>50.0% 4310<br>16.7% Zerol 150 | — | — | one layer | one layer |

Example 25

In this example, PD=2 parts by wt PnB, 1 part DPnB.

| Grams of PD added to Tube | Total Composition in Tube | Top Layer Height, mm | Bottom Layer Height, mm | Top Layer wt % | Bottom Layer Wt % |
|---|---|---|---|---|---|
| 0 | 75.0% 4310<br>25.0% 3GS | 21 | 34 | — | — |
| 1 | 9.1% PD<br>68.2% 4310<br>22.7% 3GS | 21 | 41 | 7% PnB<br>4% DPnB<br>10% 4310<br>79% 3GS | 5% PnB<br>2% DPnB<br>91% 4310<br>2% 3GS |
| 2 | 16.7% PD<br>62.5% 4310<br>20.8% 3GS | 21 | 48 | 16% PnB<br>8% DPnB<br>18% 4310<br>58% 3GS | 11% PnB<br>5% DPnB<br>81% 4310<br>3% 3GS |
| 3 | 23.1% PD<br>57.7% 4310<br>19.2% 3GS | 20 | 57 | 17% PnB<br>9% DPnB<br>18% 4310<br>56% 3GS | 15% PnB<br>8% DPnB<br>71% 4310<br>6% 3GS |
| 4 | 28.6% PD<br>50.0% 4310<br>16.7% 3GS | 16 | 69 | 18% PnB<br>9% DPnB<br>19% 4310<br>54% 3GS | 17% PnB<br>9% DPnB<br>65% 4310<br>9% 3GS |
| 5 | 33.3% PD<br>50.0% 4310<br>16.7% 3GS | — | — | one layer | one layer |

Example 26

In this example, PD=2 parts by wt PnB, 1 part DPnB.

| Grams of PD added to Tube | Total Composition in Tube | Top Layer Height, mm | Bottom Layer Height, mm | Top Layer wt % | Bottom Layer Wt % |
|---|---|---|---|---|---|
| 0 | 75.0% 4310<br>25.0% HAB22 | 21 | 34 | — | — |
| 1 | 9.1% PD<br>68.2% 4310<br>22.7% HAB22 | 23 | 39 | 7% PnB<br>4% DPnB<br>14% 4310<br>75% HAB22 | 5% PnB<br>2% DPnB<br>91% 4310<br>2% HAB22 |
| 2 | 16.7% PD<br>62.5% 4310<br>20.8% HAB22 | 25 | 45 | 15% PnB<br>7% DPnB<br>28% 4310<br>50% HAB22 | 11% PnB<br>5% DPnB<br>78% 4310<br>6% HAB22 |
| 3 | 23.1% PD<br>57.7% 4310<br>19.2% HAB22 | — | — | One Layer | One Layer |

Example 27

| Grams of DMPD added to Tube | Total Composition in Tube | Top Layer Height, mm | Bottom Layer Height, mm | Top Layer wt % | Bottom Layer Wt % |
|---|---|---|---|---|---|
| 0 | 75.0% 4310<br>25.0% Zerol 150 | 21 | 35 | — | — |
| 1 | 9.1% 1,5-DMPD<br>68.2% 4310<br>22.7% Zerol 150 | 20 | 42 | 3% 1,5-DMPD<br>13% 4310<br>84% Zerol 150 | 9% 1,5-DMPD<br>89% 4310<br>2% Zerol 150 |
| 2 | 16.7% 1,5-DMPD<br>62.5% 4310<br>20.8% Zerol 150 | 18 | 52 | 9% 1,5-DMPD<br>18% 4310<br>73% Zerol 150 | 18% 1,5-DMPD<br>77% 4310<br>5% Zerol 150 |
| 3 | 23.1% 1,5-DMPD<br>57.7% 4310<br>19.2% Zerol 150 | 8 | 68 | 14% 1,5-DMPD<br>25% 4310<br>61% Zerol 150 | 24% 1,5-DMPD<br>63% 4310<br>13% Zerol 150 |
| 4 | 28.6% 1,5-DMPD<br>50.0% 4310<br>16.7% Zerol 150 | — | — | One Layer | One Layer |

Example 28

| Grams of OP added to Tube | Total Composition in Tube | Top Layer Height, mm | Bottom Layer Height, mm | Top Layer wt % | Bottom Layer Wt % |
|---|---|---|---|---|---|
| 0 | 75.0% 4310<br>25.0% Zerol 150 | 21 | 34 | — | — |
| 1 | 9.1% OP<br>68.2% 4310<br>22.7% Zerol 150 | 22 | 40 | 7.8% OP<br>16.3% 4310<br>75.9% Zerol 150 | 6.4% OP<br>91.5% 4310<br>2.1% Zerol 150 |
| 2 | 16.7% OP<br>62.5% 4310<br>20.8% Zerol 150 | 19 | 51 | 14.7% OP<br>32.6% 4310<br>52.7% Zerol 150 | 13.4% OP<br>79.3% 4310<br>7.3% Zerol 150 |
| 3 | 23.1% OP<br>57.7% 4310<br>19.2% Zerol 150 | — | — | One Layer | One Layer |

Results show compatibilizers of the present invention improve the solubility between hydrofluorocarbons and conventional lubricants by drawing significant amounts of refrigerant (4310) into the lubricant phase (top layer), and lubricant (3GS or Zerol 150) into the refrigerant phase (bottom layer). The compatibilizers improve solubility significantly better than Isopar® H alone, which never reached one phase. The combination of PnB, DPnB and Isopar H surprisingly draws more 4310 into the lubricant phase (17%) than either PnB, DPnB or Isopar H alone (15%, 13% and 0.4%) respectively after one gram is added. A most preferred compatibilizer by this method is 1-octyl pyrrolidin-2-one, which required only 3 grams to reach one layer with Zerol 150 alkylbenzene lubricant.

Hexylene glycol was also tested as comparative data with HFC-4310mee and Zerol 150 but the solution remained two layers even after 10 grams of hexylene glycol was added.

Example 29

Lubricant return was tested in an lubricant-return apparatus as follows. Liquid refrigerant was fed from a pressurized cylinder through copper tubing to a heater where it was vaporized. The refrigerant vapor then passed through a pressure regulator and metering valve to control flow at a constant rate of 1,100 cc per minute and 101 kPa (1 atmosphere) pressure. The refrigerant vapor was fed to another copper tube 180 cm in length and 0.635 cm outer diameter formed into a U-shape and placed in a constant temperature bath. The U-shaped tube (U-tube) began with a straight vertical section 37 cm long then bent to a horizontal section 27 cm long at the bottom of the bath. The tube then rose vertically in a zigzag pattern with four 23 cm lengths, followed by another vertical straight section 23 cm long. The U-tube was filled with 10 grams of lubricant, optionally containing compatibilizer, which was added to the U-tube through the 37 cm vertical tube. Vapor refrigerant passed slowly through the lubricant in the U-tube. Refrigerant and lubricant exiting the U-tube was collected in a receiver and then the refrigerant allowed to evaporate from the lubricant. Lubricant was then weighed to determine how much lubricant was carried out of the U-tube by the refrigerant.

Refrigerant R407C was placed in the refrigerant cylinder. Suniso 3GS mineral oil, or Suniso 3GS oil and compatibilizers of the present invention were placed in the copper U-tube, wherein the combined lubricant and compatibilizer equaled 10 grams. The constant temperature bath was held at a temperature of −20° C. Refrigerant R407C vapor was fed through the U-tube at a flow rate of 1,100 cubic centimeters per minute and weight of lubricant in the receiver measured at 6, 10, and 20 minute time intervals. Data are shown below.

Example 29

| Lubricant Composition in | Wt % Lubricant Returned | | |
|---|---|---|---|
| U-tube | 6 min | 10 min | 20 min |
| 6% 5-methyl-2-hexanone in 3GS | 11.3 | 18.1 | 26.2 |
| 6% 2-Heptanone in 3GS | 12.7 | 20.0 | 28.1 |
| Comparative Data | | | |
| POE 22 | 9.3 | 20.0 | 29.6 |
| 3GS | 0 | 0 | 0 |
| 6% Isopar(R)H in 3GS | 0 | 7.9 | 17.0 |

Results show the addition of 2-heptanone and 5-methyl-2-hexanone ketone compatibilizers to 3GS mineral oil shows significant improvement in lubricant return versus neat 3GS or Isopar H in 3GS.

Example 30

The apparatus and procedure of Example 29 was used to test refrigerant HFC-134a with Zerol 150 alkylbenzene lubricant, with and without compatibilizers. Results are shown below:

Example 30

| Lubricant Composition in | Wt % Lubricant Returned | | |
|---|---|---|---|
| U-tube | 6 Min | 10 Min | 20 Min |
| 10% PnB/5% DPnB in Zerol 150 | 15 | 24 | 34 |
| 10% PnB/5% DPnB/2% Syn-0-Ad 8478*** in Zerol 150 | 17 | 25 | 36 |
| 10% PnB/5% DPnB/0.5% BHT in Zerol 150 | 16 | 25 | 36 |
| 10% PnB/5%DPnB/1.5% n-pentane in Zerol 150 | 23 | 29 | 36 |
| 10% PnB/5% DPnB/1.5% n-octane in Zerol 150 | 21 | 30 | 39 |
| 10% PnB/5% DPnB/15% PVE 32 in Zerol 150 | 15 | 27 | 38 |
| Comparative Data | | | |
| POE 22 | 16 | 27 | 36 |
| Zerol 150 | 0 | 0 | 3 |
| 15% Ucon LB-65* in Zerol 150 | 0 | 4 | 19 |
| 15% Ucon 50-HB-100** in Zerol 150 | 0 | 0 | 7 |

*Ucon LB-65 is a polyoxyproplyene glycol lubricant sold by Union Carbide with an average molecular weight of about 340.
**Ucon 50-HB-100 is a lubricant containing equal amounts of oxyethylene and oxpropylene groups sold by Union Carbide with an average molecular weight of about 520
***Syn-0-Ad 8478 is an alkylated triaryl phosphate ester produced by Akzo Chemicals Results show addition of polyoxyalkylene glycol ether compatibilizers, optionally with additional additives such as antiwear agents or hydrocarbons, significantly improve lubricant return of alkylbenzene lubricant and provide performance equivalent to POE 22 polyol ester lubricant. The comparative data shows higher molecular weight polyoxypropylene lubricants do not provide acceptable lubricant return.

Example 31

The apparatus and procedure of Example 29 was used to test refrigerant R404A with Zerol 150 alkyl benzene lubricant, with and without compatibilizers versus POE22 polyol ester lubricant. Results are shown below.

Example 31

| Lubricant Composition in U-tube | Wt % Lubricant Returned 6 Min | Wt % Lubricant Returned 10 Min | Wt % Lubricant Returned 20 Min |
|---|---|---|---|
| 35% 1-octyl pyrrolidin-2-one in Zerol 150 | 26 | 36 | 45 |
| 12% DMM in Zerol 150 | 18 | 26 | 35 |
| 6% DMM/12% 1-octyl pyrrolidin-2-one/2% Synergol in Zerol 150 | 13 | 23 | 34 |
| 20% 1,1-dibutyl formamide in Zerol 150 | 10 | 18 | 29 |
| 20% 1-methyl caprolactam in Zerol 150 | 12 | 24 | 36 |
| 17% 1,3-dimethyoxybenzene in Zerol 150 | 17 | 24 | 35 |

-continued

| Lubricant Composition in U-tube | Wt % Lubricant Returned 6 Min | Wt % Lubricant Returned 10 Min | Wt % Lubricant Returned 20 Min |
|---|---|---|---|
| Comparative Data | | | |
| POE 22 | 0 | 5 | 17 |
| Zerol 150 | 0 | 0 | <1 |

Results show addition of compatibilizers of the present invention to Zerol 150 provide significantly improved lubricant return versus polyol ester lubricant POE 22 polyol ester lubricant.

Example 32

The apparatus and procedure of Example 29 was used to test refrigerant HFC-134a with Zerol 150 alkyl benzene lubricant, with and without compatibilizers versus POE 22 polyol ester lubricant. Results are shown below.

Example 32

| Lubricant Composition in U-tube | Wt % Lubricant Returned 6 Min | Wt % Lubricant Returned 10 Min | Wt % Lubricant Returned 20 Min |
|---|---|---|---|
| 15% Cycloheptanone/1% Orange* in Zerol 150 | 27 | 35 | 42 |
| 15% 2-Nonanone/1% Orange* in Zerol 150 | 33 | 40 | 46 |
| 15% Diisobutyl ketone/1% Cinnamon* in Zerol 150 | 31 | 37 | 43 |
| 20% DMPD in Zerol 150 | 32 | 38 | 44 |
| 20% Propylene glycol tert-butyl ether in Zerol 150 | 25 | 32 | 38 |
| 15% cyanoheptane in Zerol 150 | 32 | 39 | 47 |
| Comparative Data | | | |
| POE 22 | 19 | 29 | 37 |
| Zerol 150 | 0 | 0 | 7 |

*"Orange" and "Cinnamon" are fragrances sold by Intercontinental Fragrance

Results show addition of compatibilizers of the present invention to Zerol 150 provide lubricant return comparable to POE 22 polyol ester lubricant.

Example 33

The apparatus and procedure of Example 29 was used to test refrigerant R401A with Suniso 3GS mineral oil lubricant, with and without compatibilizers versus neat Zerol 150. Results are shown below.

Example 33

| Lubricant Composition in U-tube | Wt % Lubricant Returned 6 Min | Wt % Lubricant Returned 10 Min | Wt % Lubricant Returned 20 Min |
|---|---|---|---|
| 10% Chlorooctane in 3GS | 25 | 36 | 46 |
| 15% Chlorooctane in 3GS | 35 | 43 | 50 |
| Comparative Data | | | |
| Zerol 150 | 0 | 12 | 38 |
| 3GS | 0 | 0 | 5 |

Results show the addition of compatibilizers of the present invention to Suniso 3GS provide improved lubricant return versus Zerol 150.

Example 34

The apparatus and procedure of Example 29 was used to test refrigerant R410A with Zerol 150 alkyl benzene lubricant, with and without compatibilizers versus POE 22 polyol ester lubricant. Results are shown below.

Example 34

| Lubricant Composition in U-tube | Wt % Lubricant Returned 6 Min | Wt % Lubricant Returned 10 Min | Wt % Lubricant Returned 20 Min |
|---|---|---|---|
| 15% PnB in Zerol 150 | 15 | 26 | 33 |
| 15% DPnB in Zerol 150 | 9 | 17 | 26 |
| 15% TPnB in Zerol 150 | 0 | 10 | 19 |
| 15% PnP in Zerol 150 | 15 | 22 | 32 |
| 5% PnB/5% DPnB/5% Isopar H in Zerol 150 | 12 | 19 | 29 |
| 5% PnB/5% DPnB/5% Aromatic 150 in Zerol 150 | 15 | 23 | 33 |
| Comparative Data | | | |
| POE 22 | 0 | 11 | 22 |
| Zerol 150 | 0 | 0 | 1 |
| 15% Propylene Glycol in Zerol 150 | * | * | * |
| 15% Dipropylene glycol in Zerol 150 | * | * | * |
| 15% Ucon 50-HB100** in Zerol 150 | 0 | 0 | 6 |

*Not soluble in Zerol® 150
**Polyalkylene glycol lubricant sold by Union Carbide with oxyethylene and oxypropylene groups with an average molecular weight of 520

Results show use of compatibilizers of the present invention in Zerol 150 provide comparable to improved lubricant return versus POE 22 polyol ester lubricant.

Example 35–36

Tests were conducted to determine if refrigerant R410A could be used in an HCFC-22 Carrier heat pump (Model Tech 2000), using Zerol 150 alkylbenzene lubricant and compatibilizers of the present invention. The heat pump was outfitted with an R410A Copeland scroll compressor (ZP32K3E R-410) equipped with a sight glass and level tube in the lubricant sump. The fan-coil unit was installed in the indoor room of an environmental chamber and the outdoor unit was installed in the outdoor room. The two units were connected by 1.59 cm (⅝-inch) outer diameter copper tubing in the suction line and by 1.27 cm (½-inch) outer diameter copper tubing in the liquid line. The system was charged with 3,180 grams of refrigerant and 1,110 grams of lubricant containing compatibilizer. Refrigerant R410A with polyol ester lubricant was used as a baseline for comparison. Tests were conducted at ASHRAE cooling and low temperature heating conditions. For cooling the indoor room was controlled at 26.7° C. (80° F.) and 50% relative humidity, the outdoor room at 27.8° C. (82° F.) and 40% relative humidity. For low temperature heating, the indoor room was controlled at 21.1° C. (70° F.) and 57% relative humidity, the outdoor room at −8.3° C. (17° F.) and 60% relative humidity. Results from refrigerant side measurements are shown below.

Example 35

Cooling Test

| Lubricant Composition | Vol % Lubricant Lost From Sump (cm) | Capacity kB.t.u./hr (kW) | EER |
|---|---|---|---|
| 15% PnB in Zerol 150 | 15% | 2.91 (0.852) | 11.29 |
| 20% PnB in Zerol 200TD | 14% | 2.90 (0.849) | 11.30 |
| 20% DPnB in Zerol 150 | 20% | 2.90 (0.849) | 11.28 |
| 10% PnB/5% DPnB in Zerol 150 | 18% | 2.93 (0.858) | 11.61 |
| 10% PnB/5% DPnB in HAB22 | 18% | 3.00 (0.878) | 11.50 |
| 10% PnB/5% DPnB in 3GS | 26% | 2.92 (0.855) | 11.08 |
| 18% PnB/10% DPnB in 4GS | 23% | 2.88 (0.843) | 11.03 |
| 10% PnB/5% DPnB/15% HAB22 in 3GS | 26% | 2.92 (0.855) | 11.14 |
| 5% PnB/5% DPnB/5% Isopar H in Zerol 150 | 18% | 2.94 (0.861) | 11.48 |
| 3% PnB/8% DPnB/4% Aromatic 150 in Zerol 150 | 23% | 2.95 (0.864) | 11.25 |
| 4% PnB/7% DPnB/4% DMM in Zerol 150 | 20% | 2.97 (0.870) | 11.32 |
| 10% PnB/5% DPnB/1.5% Pentane in Zerol 150 | 20% | 3.10 (0.908) | 11.70 |
| 10% PnB/5% DPnB/15% PVE 32 in Zerol 150 | 22% | 3.00 (0.878) | 11.67 |
| 10% PnB/5% DPnB/15% PVE 32 in 3GS | 20% | 2.95 (0.864) | 11.40 |
| 7% PnB/7% DPnB/7% TPnB in 3GS | 26% | 2.92 (0.855) | 11.18 |
| 15% BnB in 3GS | 33% | 2.91 (0.852) | 11.17 |
| 20% PTB in 3GS | 27% | 2.92 (0.855) | 11.28 |
| 10% PnB/5% DPnB/2.5% BTPP in Zerol 150 | 15% | 2.96 (0.867) | 11.41 |
| Comparative Data | | | |
| POE 22 | 10% | 2.98 (0.873) | 11.70 |
| POE 32 | 12% | 2.97 (0.870) | 11.48 |
| Zerol 150 | 30% | 2.86 (0.838) | 10.97 |
| Suniso 3GS | 40% | 2.86 (0.838) | 10.82 |

Example 36

Low Temperature Heating Tests

| Lubricant Composition | Sump Lubricant Level (cm) | Capacity kB.t.u/hr (kW) | EER |
|---|---|---|---|
| 10% PnB/5% DPnB in Zerol 150 | 4.6 | 20.2 (5.92) | 8.38 |
| 3% PnB/8% DPnB/4% Aromatic 150 in Zerol 150 | 4.4 | 20.4 (5.97) | 8.45 |
| 10% PnB/5% DPnB in HAB22 | 4.9 | 20.4 (5.97) | 8.42 |
| 10% PnB/5% DPnB/2% BTPP in Zerol 150 | 5.7 | 20.1 (5.89) | 8.37 |
| 15% PVE32/10% PnB/5% DPnB in 3GS | 4.6 | 19.9 (5.83) | 8.30 |
| 5% PnB/5% DPnB/5% Isopar H in Zerol 150 | 4.7 | 20.2 (5.92) | 8.35 |
| Comparative Data | | | |
| POE 22 | 5.5 | 20.0 (5.86) | 8.35 |
| Zerol 150 | 4.3 | 19.3 (5.65) | 8.00 |

Results show significant increases in lubricant return, energy efficiency and capacity when compatibilizers are added to Zerol 150, Suniso 3GS or 4GS and several cases with performance equivalent to or superior than polyol esters. There is also significant EER improvement during heating.

Example 37

The apparatus and procedure of Example 32 was used to test R410A refrigerant with compatibilizers of the present invention. Results for cooling are in the table below.

Example 37

| Lubricant Composition | Sump Lubricant Level (cm) | Capacity kB.t.u./hr (kW) | EER |
|---|---|---|---|
| 10% PnB/5% DPnB in Zerol 150 | 5.00 | 3.01 (0.882) | 11.71 |
| 10% PnB/5% DPnB/1.5% Pentane in Zerol 150 | 4.95 | 3.04 (0.890) | 11.98 |
| Comparative Data | | | |
| POE 22 | 5.72 | 3.09 (0.905) | 12.04 |
| 1.5% Pentane in Zerol 150 | 4.40 | 2.93 (0.858) | 11.23 |

The data show that using only pentane provides inadequate lubricant return, capacity and energy efficiency. PnB/DPnB as compatibilizer provides increased performance and a combination PnB/DPnB/pentane as compatibilizer provides the best overall performance, including comparable EER with polyol ester lubricant POE22.

Example 38

The apparatus and procedure of Example 32 was used to test R410A refrigerant with compatibilizers of the present invention. In this test, however, the HCFC-22 evaporator was replaced with and R410A evaporator. Results for cooling are below.

Example 38

| Lubricant Composition | Sump Lubricant Level (cm) | Capacity kB.t.u./hr (kW) | EER |
|---|---|---|---|
| 10% 2-heptanone/1% orange* in Zerol 150 | 5.33 | 3.17 (0.928) | 11.87 |
| 15% 2-nonanone/1% cinnamon* in Zerol 150 | 5.60 | 3.15 (0.923) | 11.89 |
| 20% DMPD in Zerol 150 | 5.70 | 3.15 (0.923) | 11.92 |
| 10% PnB/10% DMPD in Zerol 150 | 5.50 | 3.16 (0.925) | 11.94 |
| 20% 1,5-DMPD in Zerol 150 | 5.90 | 3.14 (0.920) | 11.97 |
| Comparative Data | | | |
| POE 22 | 6.80 | 3.35 (0.981) | 12.55 |
| Zerol 150 | 4.27 | 3.07 (0.899) | 11.30 |

*"Orange" and "Cinnamon" are fragrances sold by Intercontinental Fragrance

The data shows a significant improvement in capacity, energy efficiency and lubricant return using compatibilizers versus neat Zerol 150, even though the system had an HCFC-22 condenser and an R410A evaporator.

Example 39

Tests were conducted to determine if R410A refrigerant could be used in an R410A heat pump using Zerol 150 alkylbenzene lubricant and compatibilizers. The heat pump was outfitted a sight glass and level tube in the lubricant sump. The fan-coil unit was installed in the indoor room of an environmental chamber and the outdoor unit was installed in the outdoor room. The two units were connected by 1.59 cm (5/8-inch) outer diameter copper tubing in the suction line and by 1.27 cm (½-inch) outer diameter copper tubing in the liquid line. The system was charged with 3,860 grams of refrigerant and 1270 ml of lubricant containing compatibilizers of the present invention. Refrigerant R410A with POE 22 polyol ester lubricant was used as a baseline for comparison. Tests were conducted at ASHRAE cooling conditions. For cooling the indoor room was controlled at 26.7° C. (80° F.) and 50% relative humidity, the outdoor room at 27.8° C. (82° F.) and 40% relative humidity. Results from refrigerant side measurements are shown below.

Example 39

Cooling Test

| Lubricant Composition | Vol % Lubricant Lost From Sump (cm) | Capacity kB.t.u./hr (kW) | EER |
|---|---|---|---|
| 10% PnB/5% DPnB in Zerol 150 | 16% | 3.04 (0.890) | 12.59 |
| 10% PnB/5% DPnB/in Zerol 150 with R410A + 0.5% pentane | 17% | 3.05 (0.893) | 12.67 |
| 10% PnB/5% DPnB in Zerol 150 with R410A + 0.5% 1,1,1,3,3-pentafluoropropane | 23% | 3.03 (0.887) | 13.06 |
| 10% PnB/5% DPnB in Zerol 150 with R410A + 0.5% 1,1-dichloro-1,1,1-trifluoroethane | 19% | 3.04 () | 13.11 |
| 12% DMM in Zerol 150 | 20% | 3.04 (0.890) | 12.88 |
| 11% Diisobutyl ketone/1% orange** in Zerol 150 | 21% | 3.02 (0.884) | 12.99 |
| 11% 2-Nonanone/1% cinnamon** in Zerol 150 | 20% | 3.03 (0.887) | 13.02 |
| 20% 1-octyl-pyrrolidin-2-one in Zerol 150 | 18% | 3.07 (0.899) | 13.35 |
| 45% 1-octyl-pyrrolidin-2-one in Zerol 150 | 13% | 3.09 (0.905) | 13.50 |
| 20% N-methylcaprolactam in Zerol 150 | 21% | 3.11 (0.911) | 13.56 |
| Comparative Data | | | |
| POE 22 | 10% | 3.09 (0.905) | 13.54 |
| Zerol 150* | 38% | 2.96 (0.867) | 12.43 |

*Zerol 150 test was stopped before completion - compressor sump lubricant level became too low
**"Orange" and "Cinnamon" are fragrances sold by Intercontinental Fragrance Results show improved lubricant return, capacity and efficiency when compatibilizers of the present invention are added to Zerol 150. Use of 1-octyl pyrrolidin-2-one amide compatibilizer shows performance equivalent to the POE 22 polyol ester lubricant baseline.

Example 40

Tests were conducted to determine if HFC-134a refrigerant could be used in a domestic refrigerator (Whirlpool 21 cubic foot) using conventional lubricants Zerol 150 or Suniso 3GS and compatibilizers of the present invention. The refrigerator was outfitted with pressure and temperature measuring devices as well as power measurement to the hermetic reciprocating compressor and two fans. The compressor was also fitted with a sight glass to monitor lubricant level during operation. The refrigerator was tested in a room controlled at 27.8° C. and 40% relative humidity. The refrigerator was turned on and allowed to cool until the refrigerated compartment reached 3.3° C. The energy efficiency (COP) and capacity were then calculated using a thermodynamic model based on temperature, pressure and power inputs. In all tests, lubricant level was adequate indicating no lubricant return problems.

Example 40

| Lubricant Composition | Capacity (Watts) | % Change in Capacity vs POE | COP | % Change in COP vs POE |
|---|---|---|---|---|
| 10% PnB/5% DPnB in Zerol 150 | 145 | +1.4% | 1.31 | +8.3% |
| 12% DMM in 3GS | 143 | — | 1.33 | +9.9% |
| 12% DMM in Zerol 150 | 145 | +1.4% | 1.34 | +10.7% |
| 6% DMM in Zerol 100 | 148 | +3.5% | 1.30 | +7.4% |
| 20% OP in Zerol 100 | 145 | +1.4% | 1.30 | +7.4% |
| 45% OP in Zerol 300 | 146 | +2.1% | 1.32 | +9.1% |
| Comparative Data | | | | |
| POE 22 | 143 | — | 1.21 | — |
| Zerol 150 | * | * | * | * |
| Zerol 75 | 146 | +2.1% | 1.25 | +3.3% |

* Evaporator was flooded and test could not be completed.

Results show a significant improvement in energy efficiency when compatibilizers of the present invention are used with conventional lubricants. Improvement is also shown when compared with using a low viscosity alkyl benzene lubricant (Zerol 75) alone. Capacities also showed improvement versus POE 22 polyol ester lubricant.

Example 41

Compatibilizers of the present invention were mixed with Zerol 150 and placed in shallow dishes in a 50% constant humidity chamber. Periodic samples of the compositions were taken and analyzed by Karl Fischer titration for water. Results are shown in ppm water versus polyol ester, polyvinyl ether and polyalkylene glycol lubricants.

Example 41

| Samples Hours | 0 | 2 | 3.5 | 5.5 | 21 | 26 | 45 | 50 | 69 | 74 |
|---|---|---|---|---|---|---|---|---|---|---|
| 15% DIP in Zerol 150 | 77 | 108 | 124 | 154 | 318 | 351 | 402 | 392 | 401 | 375 |
| 10% PnB 5% DPnB in Zerol 150 | 112 | 137 | 209 | 242 | 506 | 533 | 538 | 661 | 756 | 708 |
| Comparative Data | | | | | | | | | | |
| PVE32 | 185 | 398 | 505 | 785 | 1784 | 1917 | 2511 | 2451 | 2791 | 2630 |
| Zerol 150 | 43 | 47 | 36 | 41 | 37 | 33 | 30 | 29 | 39 | 34 |
| Ucon488 | 1175 | 1517 | 3123 | 4158 | 12114 | 12721 | 16741 | 18592 | 20133 | 19997 |
| POE 22 | 153 | 165 | 173 | 181 | 693 | 733 | 1022 | 1096 | 1199 | 1165 |

Results show compatibilizer/lubricant compositions of the present invention absorb less water than polyol ester and significantly less water than polyvinyl ether and polyalkylene glycol lubricants. Since compatibilizer/lubricant com- significantly less water than polyvinyl ether and polyalkylene glycol lubricants. Since compatibilizer/lubricant compositions of the present invention do absorb some water, they also have lower risk of having free (immisicible) water available than Zerol 150. Free water can freeze in expansion devices and cause compressor failure.

Example 42

Compositions of the present invention were tested for thermal stability. Stainless steel, aluminum and copper coupons were placed in sealed glass tubes containing R410A refrigerant, Zerol 150 lubricant and compatibilizers of the present invention. In four cases, 1,000 ppm water was added. Tubes were held for 14 days at 175° C. Results are shown in the table below.

Example 42

| After 14 days at 175° C. | R410A/Zerol 150 + 15% PnB | R410A/Zerol 150 + 5% DMM/5% DPnB/5% 140 Naptha + 1000 ppm H$_2$O | R407C/Zerol 100 + 20% 1-octylpyrrolidin-2-one + 1000 ppm H$_2$O | R410A/Zerol 150 + 10% PnB/5% DPnB + 1000 ppm H$_2$O | Comparative Data: R410A/POE 22 + 1000 ppm H2O |
|---|---|---|---|---|---|
| Copper Appearance | No observable changes | No observable changes | No observable changes | No observable changes | Corrosion and discoloration observed |
| Aluminum Appearance | No observable changes | No observable changes | No observable changes | No observable changes | No observable changes |
| Steel Appearance | No observable changes | No observable changes | No observable changes | No observable changes | No observable changes |
| Acidity as HCl in ppm | <1 | <1 | <1 | 29 | 577 |
| R410A wt % | 99.9 | 99.9 | 99.9 | 99.9 | 99.8 |

Results show compositions of the present invention are thermally stable even in the presence of 1,000 ppm water, indicating no acid formation. Polyol ester lubricant in the presence of water caused corrosion of copper due to hydrolysis and acid formation.

Example 43

Volume resistivity was measured by ASTM D-1169 method using a Balsbaugh liquid test cell connected to a Keithley model 617 electrometer. A Keithley model 247 high voltage power supply was used as the excitation source. Capacitance used for calculating both resistivity and dielectric constant was measured with a GenRad model 1189 capacitance bridge. Results are shown below.

Example 43

| Composition | Volume Resistivity (Ohm × cm) | Dielectric Constant |
|---|---|---|
| Zerol 150/PnB/DPnB (85/10/5 wt %) | $9.12 \times 10^{12}$ | 2.73 |
| Zerol 150/PnB/DPnB/Isopar H (85/5/5/5 wt %) | $1.73 \times 10^{13}$ | 2.62 |
| Comparative Data | | |
| POE 22 | $5.50 \times 10^{11}$ | 3.54 |

Results show compositions of the present invention have improved electrical properties versus POE 22 polyol ester lubricant. They show an increase in volume resistivity and a decrease in dielectric constant that improves electrical insulating properties and protects compressor electrical motor winding materials.

Example 44

Solubility and viscosity measurements were made for compositions of the present invention in Zerol 150 with R410A refrigerant. The data were used to determine the amount of refrigerant dissolved in lubricant under evaporator conditions at 10° C., 1 MPa and subsequent viscosity reduction. Data were compared with R410A/POE 22 and R410A/Zerol 150. The viscosity and percent refrigerant dissolved in lubricant at compression conditions was also determined, 80° C., 2.5 MPa. Results are shown below.

Example 44

| Composition | % Refrigerant Dissolved in Lubricant at Evaporator Conditions | Viscosity (cPoise) at Evaporator at 10° C. | % Refrigerant Dissolved in Lubricant at Compression Conditions | Viscosity (cPoise) at Compressor at 80° C. |
|---|---|---|---|---|
| R410A/10% PnB + 5% DPnB in Zerol 150 Comparative Data | 18 | 8 | 11 | 2.5 |
| R410A/POE22 | 45 | 3 | 17 | 3.1 |
| R410A/Zerol 150 | 10 | 38 | 7 | 3.2 |

Results show a significant increase in refrigerant solubility and subsequent viscosity reduction in the evaporator by a compatibilizer of the present invention when added to a conventional alkyl benzene lubricant. This viscosity reduction can result in improved lubricant return to the compressor. Because less refrigerant is dissolved in the lubricant than POE 22 at compression conditions, viscosity remains high enough to effectively lubricate the compressor.

Example 45

Figure 10:
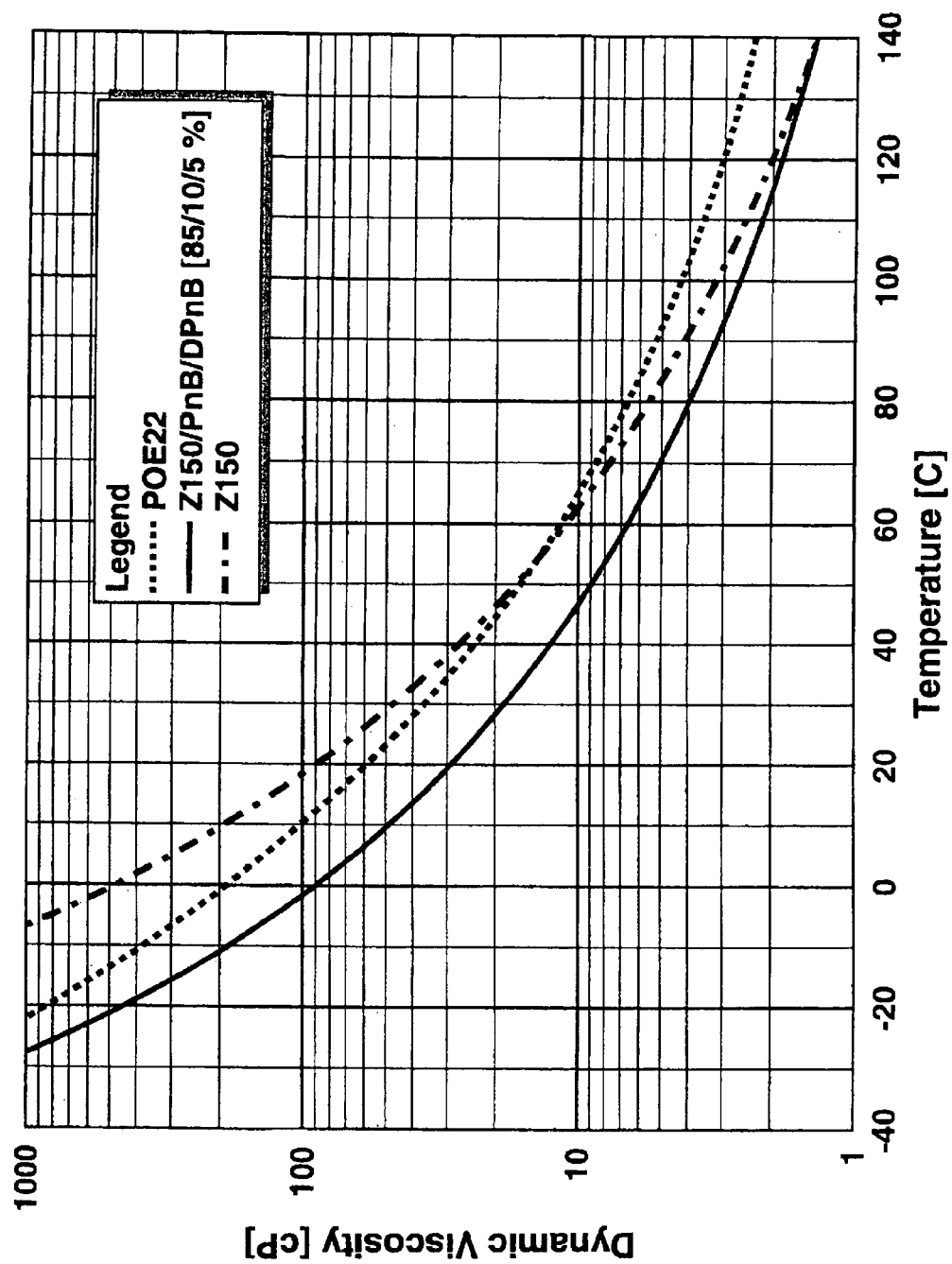
FIG. 10 is a graph of dynamic viscosity versus temperature for POE22 (Mobil Oil product Arctic EAL22, a polyol ester lubricant having a kinematic viscosity of 22 cs at 40° C.), Zerol® 150 and the composition: 10 wt % Propylene glycol n-butyl ether (PnB), 5 wt % Dipropylene glycol n-butyl ether (DPnB) and 85 wt % Zerol® 150.

Dynamic viscosity measurements were made using a ViscoPro2000 viscometer of POE 22, Zerol 150 and Zerol 150 containing 10 wt % PnB and 5 wt % DPnB. Results are shown in FIG. 10. Results show 10% PnB and 5% DPnB increase the viscosity index of Zerol 150. This gives the desirable result of lower viscosity at low temperature without lowering viscosity at high temperature, a profile similar to POE 22. This enhances lubricant return from the evaporator while maintaining good viscosity in the compressor.

Example 46

A four ball wear test using ASTM D4172B was conducted using steel balls was conducted to assess the lubricating properties for compositions of the present invention. The test was run for 60 minutes using different combinations of compatibilizer in alkyl benzene lubricant and compared to lubricant without compatibilizer. Wear scar and average coefficient of friction were measured. Results are shown below.

| | Wear Scar (mm) | Average Coefficient of Friction |
|---|---|---|
| 6% DMM in Zerol 100 | 0.85 | 0.108 |
| 20% 1-octyl pyrrolidin-2-one in Zerol 100 | 0.61 | 0.093 |
| 35% 1-octyl pyrrolidin-2-one in Zerol 150 | 0.64 | 0.091 |
| 12% DMM/2% Synergol in Zerol 150 | 0.52 | 0.113 |
| Comparative Data | | |
| Zerol 150 | 0.88 | 0.110 |

Results show lubrication properties are similar or improved when compatibilizers of the present invention are added to conventional lubricants, as evidenced by reduced size of wear scar and similar lower coefficient of friction. Addition of antiwear additives such as Synergol further improves lubrication properties.

Example 47

Compressor durability tests were conducted with compositions of the present invention. A flooded start test was performed on scroll and rotary compressors. A flooded start test is a severe condition where the compressor sump is flooded with refrigerant on shutdown. During startup, presence of refrigerant can reduce lubricant viscosity resulting in inadequate compressor lubrication. This is particularly difficult with immiscible refrigerant/lubricant systems where two layers can form in the compressor sump with the refrigerant layer on the bottom, the point at which lubricant is normally drawn into the compressor bearings. The compressors were tested at −12.2° C. suction temperature and 37.8° C. discharge temperature. The compressors were cycled for three minutes on and fifteen mutes off for 1,000 cycles. After the tests the compressors were disassembled and inspected for wear. No significant wear was observed.

Example 47

| Compressor Type | Refrigerant | Lubricant | Significant Wear |
|---|---|---|---|
| Rotary | R407C | 10% PnB/5% DPnB in Zerol 150 | None |
| Scroll | R407C | 10% PnB/5% DPnB in Zerol 150 | None |
| Comparative Data | | | |
| Rotary | HCFC-22 | Mineral Oil | None |
| Scroll | HCFC-22 | Mineral Oil | None |

Example 48

Compatibilizers of the present invention were tested for compatibility with polyester motor materials used in certain hermetic compressors. Strips of polyester film were placed in a sealed tube with HFC-134a refrigerant and different lubricant/compatibilizer combinations. The tubes were held at 150° C. for two weeks. The polyester strips were removed and bent ten times through an arc of 180° to evaluate for embrittlement. Strips in both the liquid and vapor phases were evaluated. Results are shown in the table below.

Example 48

| Lubricant tested with HFC-134a | # of Bends Before Breaking Liquid Phase | # of Bends Before Breaking Vapor Phase |
|---|---|---|
| 10% PnB/5% DPnB in Zerol 150 | 1 | 1 |
| 12% DMM in Zerol 150 | >10 | >10 |
| 20% 1-octyl pyrrolidin-2-one in Zerol 150 | >10 | >10 |
| Comparative Data | | |
| Zerol 150 | 7 | 9 |
| POE 22 | 10 | 1 |

The data show DMM ($CH_3O[CH_2CH(CH_3)O]_2CH_3$) with no free hydroxyl groups has significantly improved polyester motor material compatibility versus PnB ($C_4H_9OCH_2CH(CH_3)OH$) and DPnB ($C_4H_9O(CH_2CH(CH_3)O)_2H$), both with terminal hydroxyl groups. The data also show alkyl pyrrolidones such as 1-octyl-2-pyrrolidone are compatible with polyester motor materials and preferred for use in certain hermetic compressors.

What is claimed is:

1. A lubricant composition for use in compression refrigeration and air conditioning, comprising:
   (a) at least one lubricant selected from the group consisting of paraffins, napthenes, aromatics and poly-α-olefins;
   (b) at least one compatibilizer selected from the group consisting of: amides represented by the formulae wherein cyclo-$[(CR^6R^7)_nCON(R^5)-]$, wherein n is selected from integers from 3 to 5, $R^6$ and $R^7$ are hydrogen or contain a single saturated hydrocarbon radical among the n methylene units, and $R^5$ is selected from saturated hydrocarbon radicals containing from 1 to 12 carbon atoms, and where said amides have a molecular weight of from about 160 to about 250 atomic mass units and a carbon to oxygen ratio of from about 7 to about 16.

2. A refrigerant composition for use in compression refrigeration and air conditioning, comprising:

(a) at least one halogenated hydrocarbon selected from the group consisting of hydrofluorocarbons and hydrofluorochlorocarbons;

(b) at least one lubricant selected from the group consisting of paraffins, naphthenes aromatics and poly-α-olefins; and (c) at least one compatibilizer selected from amides represented by the formula cyclo-$[(CR^6R^7)_n CON(R^5)—]$, wherein n is selected from integers from 3 to 5, $R^6$ and $R^7$ are hydrogen or contain a single saturated hydrocarbon radical among the n methylene units, and $R^5$ is selected from saturated hydrocarbon radicals containing from 1 to 12 carbon atoms, and where said amides have a molecular weight of from about 160 to about 250 atomic mass units and a carbon to oxygen ratio of from about 7 to about 16.

3. A refrigerant composition for use in compression refrigeration and air conditioning apparatus containing paraffinic, napthenic, aromatic and/or poly-α-olefinic lubricant, said refrigerant composition comprising:

(a) at least one halogenated hydrocarbon selected from the group consisting of hydrofluorocarbons and hydrochlorofluorocarbons; and (b) at least one compatibilizer selected from amides represented by the formula cyclo-$[(CR^6R^7)_n CON(R^5)—]$, wherein n is selected from integers from 3 to 5, $R^6$ and $R^7$ are hydrogen or contain a single saturated hydrocarbon radical among the n methylene units, and $R^5$ is selected from saturated hydrocarbon radicals containing from 1 to 12 carbon atoms, and where said amides have a molecular weight of from about 160 to about 250 atomic mass units and a carbon to oxygen ratio of from about 7 to about 16.

4. A process for returning lubricant from a non-compressor zone to a compressor zone in a compression refrigeration system comprising:

(a) contacting lubricant selected from the group consisting of paraffins, naphthenes, aromatics, and polyalphaolefins, in said non-compressor zone with a halogenated hydrocarbon selected from the group consisting of hydrofluorocarbons and hydrochlorofluorocarbons, in the presence of a compatibilizer to form a solution comprising said lubricant, said halogenated hydrocarbon, and said compatibilizer; and (b) transferring said solution from said non-compressor zone to said compressor zone of said refrigeration system; wherein said compatibilizer is selected amides represented by the formula cyclo-$[(CR^6R^7)_n CON(R^5)—]$, wherein n is selected from integers from 3 to 5, $R^6$ and $R^7$ are hydrogen or contain a single saturated hydrocarbon radical among the n methylene units, and $R^5$ is selected from saturated hydrocarbon radicals containing from 1 to 12 carbon atoms, and where said amides have a molecular weight of from about 160 to about 250 atomic mass units and a carbon to oxygen ratio of from about 7 to about 16.

5. A method of solubilizing a halogenated hydrocarbon refrigerant, said halogenated hydrocarbon refrigerant selected from the group consisting of hydrofluorocarbons and hydrochlorofluorocarbons, in a lubricant said lubricant selected from the group consisting of paraffins, naphthenes, aromatics, and polyalphaolefins, which comprises the steps of contacting said lubricant with said halogenated hydrocarbon refrigerant in the presence of an effective amount of a compatibilizer and forming a solution of said lubricant and said halogenated hydrocarbon refrigerant, wherein said compatibilizer is selected from the group consisting of: amides represented by the formula cyclo-$[(CR^6R^7)_n CON(R^5)—]$, wherein n is selected from integers from 3 to 5, $R^6$ and $R^7$ are hydrogen or contain a single saturated hydrocarbon radical among the n methylene units, and $R^5$ is selected from saturated hydrocarbon radicals containing from 1 to 12 carbon atoms, and where said amides have a molecular weight of from about 160 to about 250 atomic mass units and a carbon to oxygen ratio of from about 7 to about 16.

6. A method of lubricating a compressor in a compression refrigeration apparatus containing a halogenated hydrocarbon refrigerant selected from the group consisting of hydrofluorocarbons and hydrochlorofluorocarbons, comprising the step of adding to said compressor a composition comprising:

(a) at least one lubricant selected from the group consisting of paraffins, naphthenes, aromatics, and polyalphaolefins; and (b) at least on compatibilizer selected from the group consisting of: amides represented by the formula cyclo-$[(CR^6R^7)_n CON(R^5)—]$, wherein n is selected from integers from 3 to 5, $R^6$ and $R^7$ are hydrogen or contain a single saturated hydrocarbon radical among the n methylene units, and $R^5$ is selected from saturated hydrocarbon radicals containing from 1 to 12 carbon atoms, and where said amides have a molecular weight of from about 160 to about 250 atomic mass units and a carbon to oxygen ratio of from about 7 to about 16.

* * * * *

UNITED STATES PATENT AND TRADEMARK OFFICE
CERTIFICATE OF CORRECTION

PATENT NO. : 6,962,665 B2 Page 1 of 1
APPLICATION NO. : 10/010187
DATED : November 8, 2005
INVENTOR(S) : Mahler Walter It is certified that error appears in the above-identified patent and that said Letters Patent is hereby corrected as shown below:

Title Page Item (57), Abstract, line 6: replace "efficeint" with -- efficient --

Column 2, line 48: replace "industries's" with -- industries --

Column 4, line 26: replace "nitrites" with -- nitriles --

Column 6, line 58: replace "(ohmxcm)" with -- (ohm x cm) --

Column 9, line 39: replace "Calument" with -- Calumet --

Signed and Sealed this

Thirtieth Day of September, 2008

JON W. DUDAS
*Director of the United States Patent and Trademark Office*